(12) United States Patent
Mathews et al.

(10) Patent No.: US 7,801,045 B2
(45) Date of Patent: Sep. 21, 2010

(54) HIERARCHICAL RATE LIMITING WITH PROPORTIONAL LIMITING

(75) Inventors: Gregory S. Mathews, Saratoga, CA (US); Sanjay Jain, Saratoga, CA (US)

(73) Assignee: Alcatel Lucent, Paris (FR)

( * ) Notice: Subject to any disclaimer, the term of this patent is extended or adjusted under 35 U.S.C. 154(b) by 460 days.

(21) Appl. No.: 11/765,385

(22) Filed: Jun. 19, 2007

(65) Prior Publication Data

US 2008/0316921 A1 Dec. 25, 2008

(51) Int. Cl.
*H04L 12/26* (2006.01)
(52) U.S. Cl. ........................ 370/235; 370/229
(58) Field of Classification Search ........................ None
See application file for complete search history.

(56) References Cited

U.S. PATENT DOCUMENTS

| | | | |
|---|---|---|---|
| 5,850,399 A | 12/1998 | Ganmukhi et al. | |
| 6,122,673 A | 9/2000 | Basak et al. | |
| 6,438,102 B1* | 8/2002 | Chui et al. | 370/229 |
| 6,801,500 B1* | 10/2004 | Chandran | 370/230.1 |
| 6,850,490 B1 | 2/2005 | Woo et al. | |
| 2002/0176361 A1* | 11/2002 | Wu et al. | 370/231 |
| 2002/0186661 A1 | 12/2002 | Santiago et al. | |
| 2003/0227872 A1* | 12/2003 | Tundlam et al. | 370/232 |
| 2004/0013089 A1* | 1/2004 | Taneja et al. | 370/235 |
| 2005/0108444 A1* | 5/2005 | Flauaus et al. | 710/15 |
| 2006/0146710 A1* | 7/2006 | Roy | 370/235 |
| 2008/0089351 A1* | 4/2008 | Hu | 370/412 |

* cited by examiner

*Primary Examiner*—Huy D Vu
*Assistant Examiner*—James P Duffy
(74) *Attorney, Agent, or Firm*—Wilson & Ham

(57) ABSTRACT

A network flow controller to manage network traffic bandwidth is described. Embodiments of the network flow controller include a hierarchical flow creditor, a proportional flow creditor, and a rate limiter. The hierarchical flow creditor is configured to manage a plurality of hierarchical credit accounts. The hierarchical credit accounts include a shared credit account associated with a plurality of distinct network traffic flows for a shared bandwidth resource. The proportional flow creditor is configured to track an oversubscription of the shared bandwidth resource by the plurality of distinct network traffic flows. The rate limiter is coupled to the hierarchical flow creditor and the proportional flow creditor. The rate limiter is configured to limit at least one of the distinct network traffic flows based on the oversubscription tracked by the proportional flow creditor.

17 Claims, 8 Drawing Sheets

HIERARCHICAL RATE LIMITING WITH PROPORTIONAL LIMITING

BACKGROUND OF THE INVENTION

Bandwidth is a limited commodity in computer data networks. Sharing bandwidth in a computer data network allows multiple user-flows to be present on a data channel at the same time. Variable and fixed amounts of bandwidth can be allotted to particular users and groups of users according to their subscription levels or priorities.

Rate limiting is a process for limiting the amount of bandwidth that network traffic flows can consume. Rate limiting may be implemented for individual network traffic flows or for groups of network traffic flows. Network traffic flows that exceed their bandwidth limit can be subject to an action which effectively decreases the network traffic flow. For example, rate limiting may control a network traffic flow using a reduction in priority, a change in traffic class or type of service (TOS), or a loss of flow packets (i.e., by dropping packets). The dropped packets will routinely be detected by the destination node as not having been received and requested to be retransmitted by the source node.

Conventional rate limiting implementations determine whether or not a network flow is in violation of a configured rate through the use of either timestamps or credit buckets. In timestamp implementations, the time between arriving packets is monitored, and a violation is detected if the time between arriving packets is below a threshold (e.g., a threshold based on the packet size and the transmission rate). In credit bucket implementations, credits for individual or group network flows accumulate over time (e.g., according to a refresh rate), and packets arriving in the corresponding individual or group network flows cause a debit from the credit amount, for example, based on the size of each arriving packet. A violation is detected if the arriving packet debits the credit bucket more than the amount of credit available at the time. Both the timestamp and credit bucket implementations can accumulate unused time or credits to handle larger packets or bursts interspersed with slower traffic. A maximum value or saturation point for accumulated time or credits limits the maximum packet size or impact of a burst of packets.

Conventional rate limiting implementations also include hierarchical rate limiting. Hierarchical rate limiting uses multiple credit buckets (or timers, alternatively) to control network traffic flow. Violation checks for each credit bucket (or timer) are done in parallel and the results are combined. For convenience, hierarchical rate limiting will be discussed in terms of credit buckets, although other implementations use timestamps in a similar manner.

There are different types of hierarchical rate limiting implementations, including using a shared credit bucket for a group of network flows, using a combination of individual and shared credit buckets for a group of individual network flows, and using different credit buckets for a single network flow. Using a shared credit bucket for a group of network flows allows each network flow to use as much as the entire shared credit bucket (e.g., 100 Mbps), but a violation occurs if the total of the combined network flows surpasses the available credit of the shared credit bucket. Using a combination of individual and shared credit buckets is similar, except that the individual network flows may be limited to a lower credit maximum (e.g., 50 Mbps) than the shared credit bucket. Using different credit buckets for a single network flow is implemented by using one credit bucket if the network flow is in a first bandwidth range (e.g., below 50 Mbps) and a different credit bucket if the network flow is in a second bandwidth range (e.g., between 50 Mbps and 100 Mbps). Different rate limiting actions such as priority reduction and packet dropping may be implemented depending on which bucket applies to the network flow.

The control over how bandwidth is partitioned in conventional hierarchical rate limiting implementations is very limited. If a single network flow is allowed to consume all of the bandwidth allocated to a group of network flows, using a shared credit bucket, then all but one of the network flows are precluded from using the shared bandwidth. Alternatively, if multiple, but less than all, network flows are allowed to consume all of the bandwidth, then the remaining network flows are precluded from using the shared bandwidth. Other conventional implementations partition available bandwidth according to straight priority, which also potentially precludes one or more network flows from accessing the shared bandwidth.

SUMMARY OF THE INVENTION

Embodiments of an apparatus are described. In one embodiment, the apparatus is a network flow controller to manage network traffic bandwidth. Embodiments of the network flow controller include a hierarchical flow creditor, a proportional flow creditor, and a rate limiter. The hierarchical flow creditor is configured to manage a plurality of hierarchical credit accounts. The hierarchical credit accounts include a shared credit account associated with a plurality of distinct network traffic flows for a shared bandwidth resource. The proportional flow creditor is configured to track an oversubscription of the shared bandwidth resource by the plurality of distinct network traffic flows. The rate limiter is coupled to the hierarchical flow creditor and the proportional flow creditor. The rate limiter is configured to limit at least one of the distinct network traffic flows based on the oversubscription tracked by the proportional flow creditor. Other embodiments of the apparatus are also described.

Embodiments of a method are also described. In one embodiment, the method is a method for controlling network traffic. Embodiments of the method include receiving a plurality of distinct network traffic flows for a shared bandwidth resource, calculating a proportionality factor indicative of an oversubscription of the shared bandwidth resource by the plurality of distinct network traffic flows, and limiting at least one of the distinct network traffic flows based on the proportionality factor. Other embodiments of the method are also described.

Embodiments of a computer program product are also described. In one embodiment, the computer program product is a computer readable storage medium embodying a program of machine-readable instructions, executable by a digital processor, to perform operations to control network traffic. The operations include an operation to receive a plurality of distinct network traffic flows for a shared bandwidth resource, an operation to calculate a proportionality factor indicative of an oversubscription of the shared bandwidth resource by the plurality of distinct network traffic flows, and an operation to proportionally limit the plurality of distinct network traffic flows based on the proportionality factor. Other embodiments of the computer program product are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

The following description references embodiments of rate limiting implementations which utilize a combination of hierarchical rate limiting and proportional rate limiting. In particular, the following description references rate limiting implementations using timestamps or credit buckets. It should be noted that specific references to timestamps or credit buckets, should be understood as exemplary of possible rate limiting implementations, generally. Each reference to a timestamp implementation may be equivalently implemented using one or more credit buckets. Similarly, each reference to a credit bucket implementation may be equivalently implemented using timestamps. Hence, specific references to timestamp or credit bucket implementations of the rate limiting embodiments should not be limited to a specific type of implementation, unless noted otherwise. Furthermore, some embodiments of the described rate limiting implementations may be implemented using other types of accounting or tracking configurations.

Figure 1:
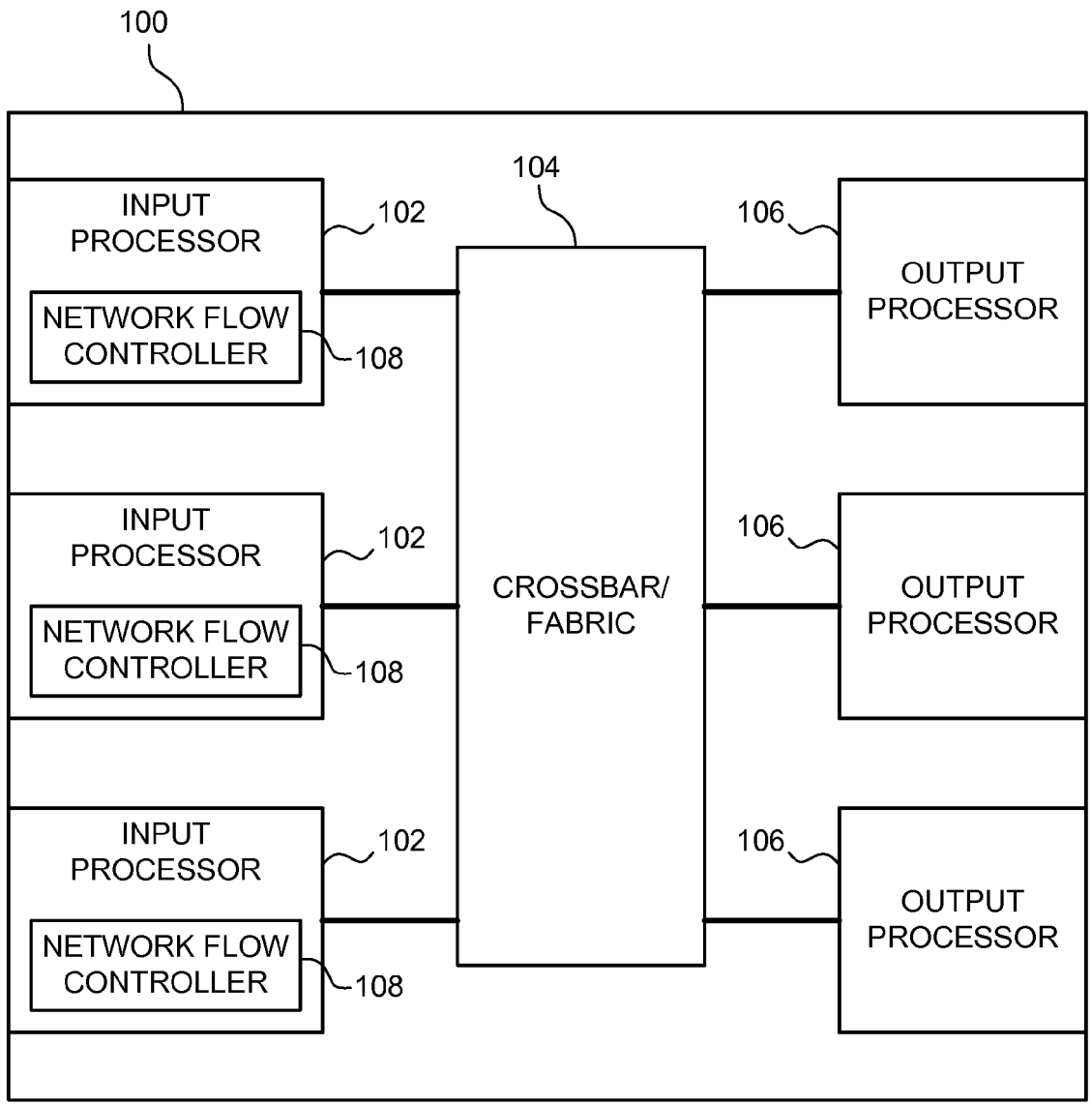
FIG. 1 depicts a schematic diagram of one embodiment of a network node.

FIG. 1 depicts a schematic diagram of one embodiment of a network node 100. The illustrated network node 100 includes a plurality of input processors 102, a crossbar/fabric 104, and a plurality of output processors 106. The number of input processors 102 and output processors 106 may vary depending on the implementation of the network node 100. In some embodiments, the network node 100 is representative of a network router, a network switch, or another networking component.

Figure 2:
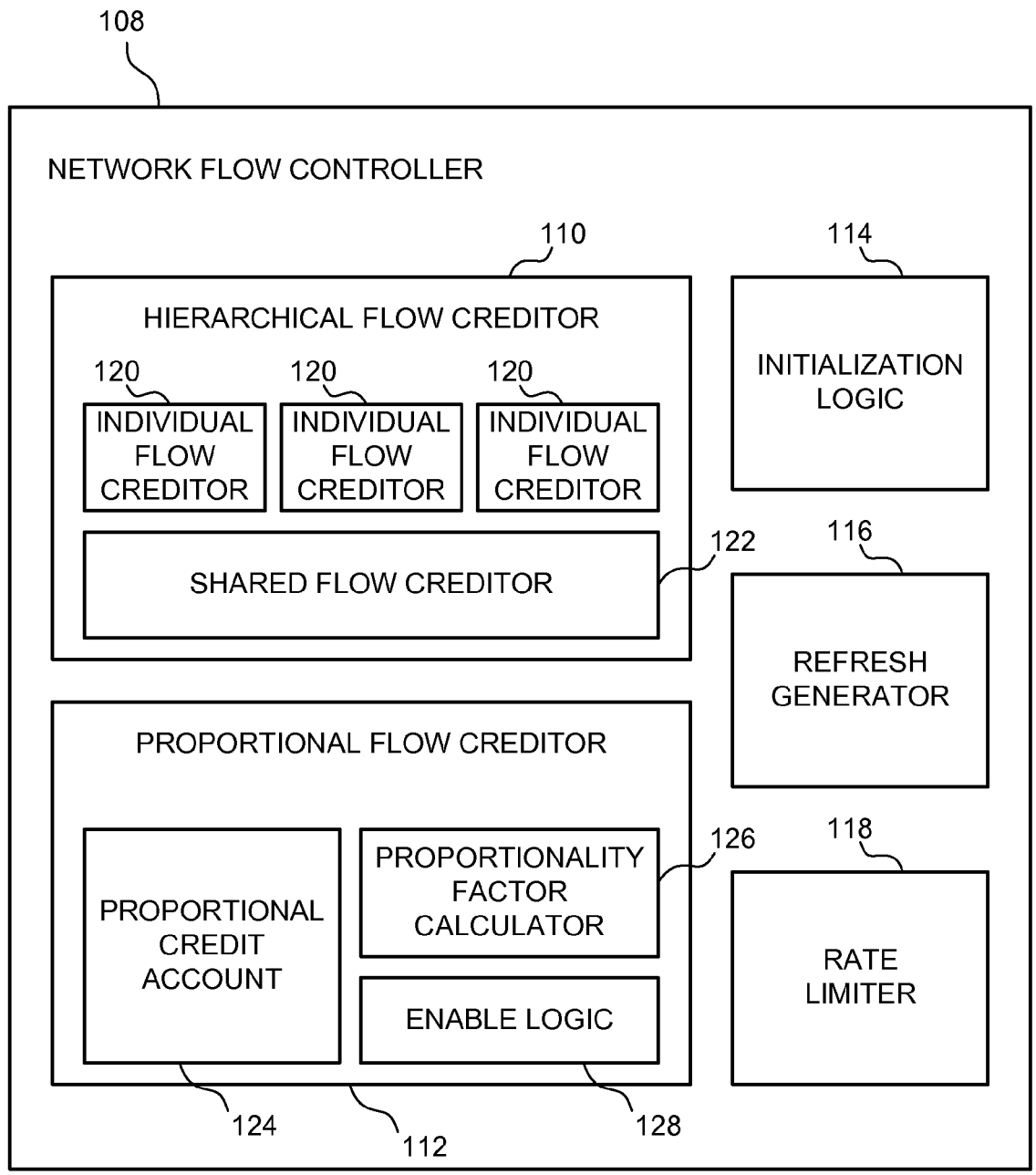
FIG. 2 depicts a schematic diagram of one embodiment of a network flow controller of the network node of FIG. 1.

In general, data packets arrive at the input processors 102 via corresponding input interfaces (not shown). The input processors 102 identify which data packets belong to certain network data traffic flows, also referred to as network traffic flows. In the depicted embodiment, each of the input processors 102 includes a network flow controller 108. An exemplary network flow controller 108 is shown in FIG. 2 and described in more detail below. Alternatively, other embodiments of the network node 100 may implement fewer network flow controllers 108 or even a single network flow controller 108. Additionally, the network flow controllers 108 may be located in different locations within the network node 100, depending at least in part on the number of network flow controllers 108 implemented.

The input processors 102 transfer the received data packets 104 to the crossbar/switch-fabric 104, which combines and/or routes the various network flows to the appropriate output processors 106. The output processors 106 then process the data packets (e.g., add header data) and output the data packets via an output interface (not shown) to the network for transmission to the next network node.

It should be noted that each of the input processors 102 and the output processors 106 may process data packets from multiple network data traffic flows. In particular, the input processors 102 identify the data packets belonging to each network flow and separate the identified data packets, for example, to be processed differently. The output processors 106 may recombine the data packets from different network flows to be transmitted across a shared resource of the network. Some exemplary shared resources include, but are not limited to, network cabling and other data transmission components.

FIG. 2 depicts a schematic diagram of one embodiment of a network flow controller 108 of the network node 100 of FIG. 1. The illustrated network flow controller 108 includes a hierarchical flow creditor 110, a proportional flow creditor 112, initialization logic 114, a refresh generator 116, and a rate limiter 118. Although these components are shown and described in some detail herein, other embodiments of these components may be implemented that are capable of fewer or more functions than are described herein. Furthermore, some embodiments of the network flow controller 108 may include fewer or more components than are shown in FIG. 2.

Figure 4:
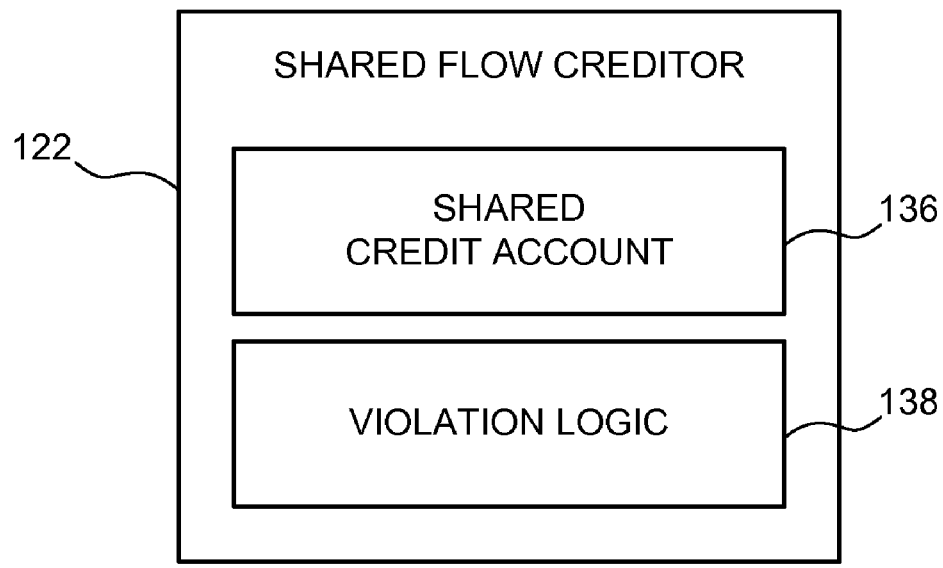
FIG. 4 depicts a schematic diagram of one embodiment of the shared flow creditor of the network flow controller of FIG. 2.

In one embodiment, the hierarchical flow creditor 110 includes a plurality of individual flow creditors 120 and at least one shared flow creditor 122. In general, the hierarchical flow creditor 110 is configured to manage a plurality of hierarchical credit accounts. Exemplary hierarchical credit accounts include a shared credit account associated with a plurality of distinct network traffic flows for a shared bandwidth resource. The shared flow creditor 122 corresponds to the shared credit account. In one embodiment, the shared flow creditor 122 manages the shared credit account to track a shared credit balance for a combination of distinct network traffic flows which share a shared network resource. In some embodiments, the hierarchical flow creditor 110 includes multiple shared flow creditors 122 corresponding to different groups of network traffic flows. An exemplary shared flow creditor 122 is shown in FIG. 4 and described in more detail below.

Figure 3:
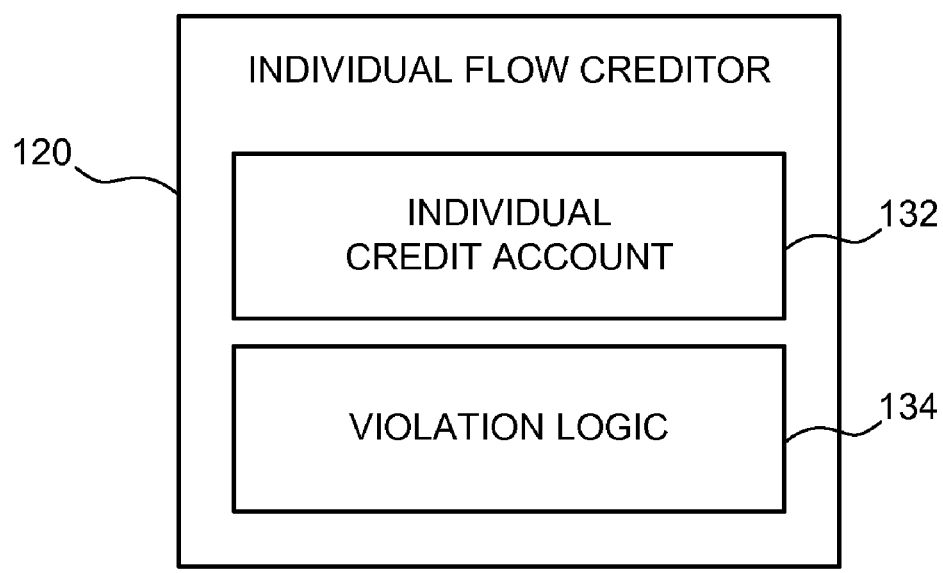
FIG. 3 depicts a schematic diagram of one embodiment of the individual flow creditor of the network flow controller of FIG. 2.

Other exemplary hierarchical credit accounts include a plurality of individual credit accounts. The individual flow creditors 120 correspond to the individual credit accounts. In one embodiment, each of the individual flow creditors 120 manages an individual credit account to track a credit balance for the corresponding network traffic flow. An exemplary individual flow creditor 120 is shown in FIG. 3 and described in more detail below.

It should be noted that the references to credit accounts, generally, are inclusive of time credits used in timestamp implementations of rate limiting, byte (or other data size designation) credits used in credit bucket implementations of rate limiting, as well as other types of credits accumulated in other rate limiting implementations.

The proportional flow creditor 112 includes a proportional credit account 124, a proportionality factor calculator 126, and enable logic 128. Other embodiments of the proportional flow creditor 112 may include fewer or more components. Additionally, some embodiments of the network flow controller 108 include multiple proportional flow creditors 112—one for each shared flow creditor 122. In one embodiment, the proportional flow creditor 112 is configured to track an oversubscription of the shared bandwidth resource by the plurality of distinct network traffic flows. An oversubscription occurs when too many data packets arrive for a given bandwidth allocation. In other words, the proportional flow creditor 112 determines if more data packets arrive for a group of network traffic flows than the bandwidth allocated by the network flow controller 108. The proportional flow creditor 112 may make this determination based on the arrival frequency (e.g., in a timestamp implementation) or the combined size (e.g., in a credit bucket implementation) of the received data packets.

Additionally, the proportional flow creditor 112 is configured to manage the proportional credit account 124. The proportional credit account 124 tracks a credit balance indicative of the oversubscription of the shared bandwidth resource. In order to manage an oversubscription of the shared bandwidth resource, the proportional flow creditor 112 invokes the proportionality factor calculator 126 to calculate a proportionality factor indicative of the oversubscription of the shared bandwidth resource. In one embodiment, the proportionality factor calculator 126 calculates the proportionality factor according to the following:

$$PF = \frac{-C}{A},$$

where PF designates the proportionality factor, C designates a quantification of the oversubscription of the shared bandwidth resource, and A designates a credit refresh quantity of the shared credit account. For example, if the shared bandwidth resource is oversubscribed by −5000 bytes, and the credit refresh quantity for the shared bandwidth resource is 1000 bytes, then the proportionality factor would be 5.0 (i.e., −5000/1000=5.0). As a matter of convention, an oversubscription of the shared bandwidth resource is expressed as a negative number (so the proportionality factor is expressed as a positive number), and an undersubscription of the shared bandwidth resource is expressed as a positive number. In some embodiments, the proportionality factor calculator 126 sets the proportionality factor to zero, if the proportionality factor calculation would result in a negative proportionality factor. Some examples of how the proportionality factor may be used are described in more detail below.

In one embodiment, the proportional flow creditor 112 includes the enable logic 128 to enable or disable the proportional flow creditor 112. In this way, the network flow controller 108 may implement proportional rate limiting when the proportional flow creditor 112 is enabled and implement conventional rate limiting when the proportional flow creditor 112 is disabled.

The network flow controller 108 also includes the initialization logic 114. In one embodiment, the initialization logic 114 is configured to initialize the proportionality factor to a value of zero when proportional rate limiting is enabled. In some embodiments, the initialization logic 114 also may initialize other settings for the proportional flow creditor 112, the hierarchical flow creditor 110, or the network flow controller 108, generally.

In one embodiment, the refresh generator 116 is configured to refresh credit balances for the proportional credit account 124 and the hierarchical credit accounts. The refresh rate, or the time between consecutive refresh events, may be the same or different for the various credit accounts. Also, the refresh quantity, or the amount of credit in time or bytes, for example, for each of the credit accounts may be the same or different. The type of refresh credits (e.g., time or bytes) depends on the type of rate limiting implementation (e.g., timestamp or credit buckets) that is used.

In one embodiment, the rate limiter 118 is logically and/or physically coupled to the hierarchical flow creditor 110 and the proportional flow creditor 112. The rate limiter 118 is configured to limit at least one of the distinct network traffic flows based on the oversubscription tracked by the proportional flow creditor 112. In one embodiment, the rate limiter 118 proportionally limits each of the plurality of network traffic flows. In other words, the amount that all of the network traffic flows is limited depends, for example, on the total allocated bandwidth of a group of network traffic flows and the credit amounts allocated to the individual network traffic flows. In one embodiment, the rate limiter 118 uses the proportionality factor generated by the proportionality factor calculator 126 to proportionally limit the network traffic flows. Other proportionality determinations may be used in other embodiments of the network flow controller 108. Limiting the network traffic flows may be accomplished by dropping packets, forwarding packets with a reduced priority, forwarding packets without a change, or forwarding packets with a change in traffic class or type of service (TOS).

FIG. 3 depicts a schematic diagram of one embodiment of the individual flow creditor 120 of the network flow controller 108 of FIG. 2. The illustrated individual flow creditor 120 includes an individual credit account 132 and violation logic 134. As described above, the individual flow creditor 120 is configured to track a credit balance of the individual credit account 132 corresponding to a particular individual network traffic flow.

In one embodiment, the violation logic 134 is configured to determine whether a received packet quantity of the corresponding network traffic flow exceeds the credit balance for the corresponding individual credit account 132. For example, if the individual credit account 132 is allocated 50 Mbps worth of credit (e.g., using either timestamps or credit buckets), then the violation logic 134 determines if the rate of data packets received exceeds the allocated 50 Mbps. Additionally, the violation logic 134 may compute an effective packet quantity based on the received packet quantity and the proportionality factor. In one embodiment, the effective packet quantity relies on an effective packet size, which may be computed according to the following $$P'=P \times (1+PF),$$

where P' designates the effective packet size, and P designates an actual packet size. For example, if the data packet size is 1 byte and the proportionality factor is 5.0, then the effective packet size would be 6 bytes (i.e., 1×(1+5)=6) because each received data packet would the equivalent of 6 data packets. As a result, the corresponding network traffic flow may be limited to processing only one sixth of the packets that would otherwise be processed because every packet appears to be six times larger than it actually is. The use of the proportionality factor, the effective packet quantity, and the effective packet size will be more apparent as they are used in the examples provided below.

FIG. 4 depicts a schematic diagram of one embodiment of the shared flow creditor 122 of the network flow controller 108 of FIG. 2. The illustrated shared flow creditor 122 includes a shared credit account 136 and violation logic 138.

As described above, the shared flow creditor 122 is configured to track a shared credit balance of the shared credit account 136 corresponding to a shared network traffic flow. In an embodiment, the violation logic 138 is configured to determine whether a combined packet quantity of the combination of distinct network traffic flows exceeds the shared credit balance for the combination of distinct network traffic flows. For example, if the shared credit account 136 is allocated 100 Mbps worth of credit (e.g., using either timestamps or credit buckets), then the violation logic 138 determines if the rate of data packets received exceeds the allocated 100 Mbps. It should be noted that the violation logic 138 may detect a violation of the shared credit balance even though the individual credit balances are not violated. For example, if three distinct network flows are each allocated 50 Mbps, but the shared credit for the combined three network flows is 100 Mbps, then the violation logic 138 detects a violation of the shared credit balance if all three network flows receive the equivalent of 50 Mbps, for a combined total of 150 Mbps, of network traffic.

Figure 5:
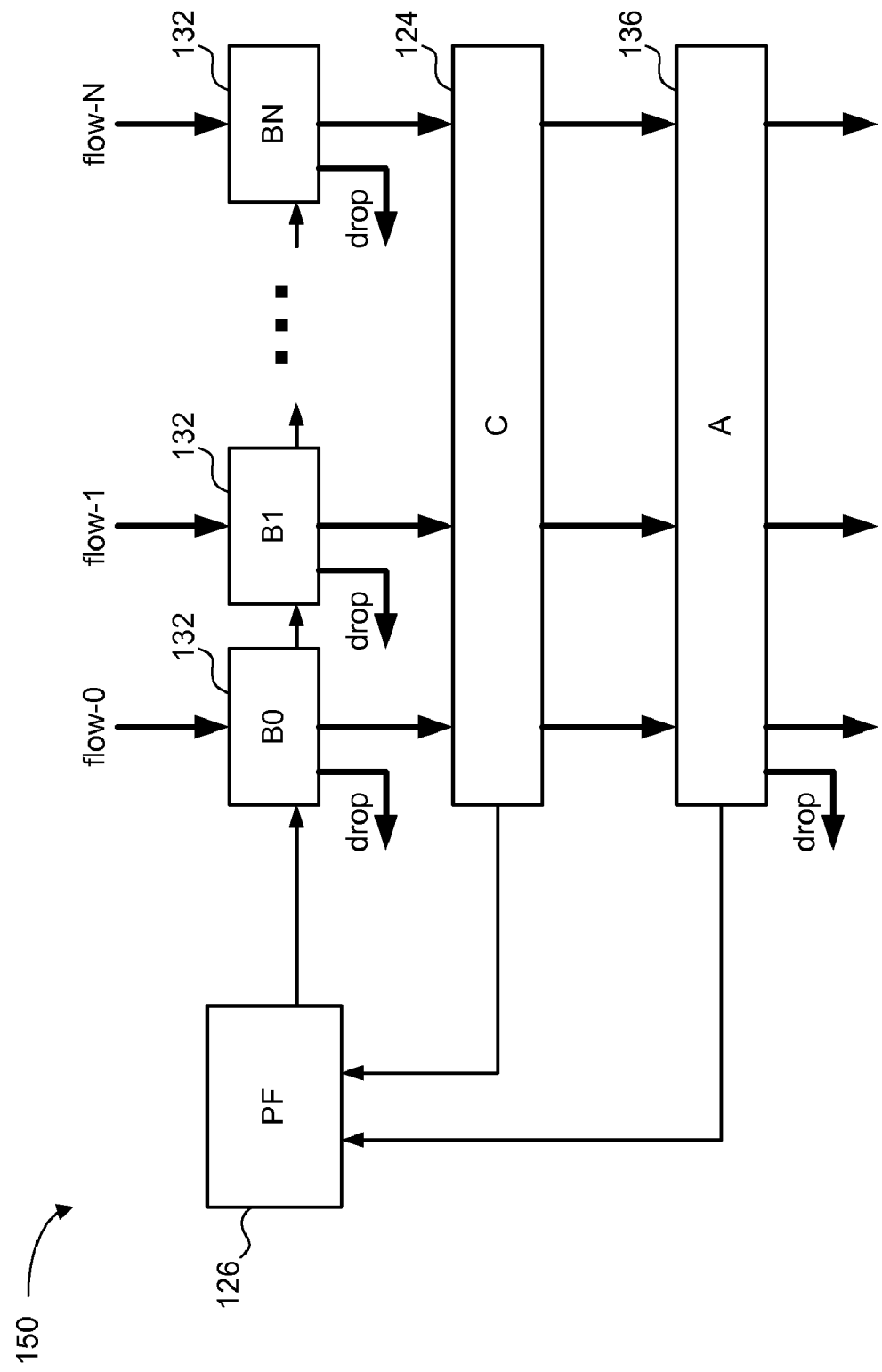
FIG. 5 depicts a schematic process diagram of one embodiment of network flow control process.

FIG. 5 depicts a schematic process diagram of one embodiment of network flow control process 150. The illustrated network flow control process 150 shows an exemplary flow of packets through the network flow controller 108. However, the network flow control process 150 does not necessarily impose a particular physical configuration or order of operations for the network flow controller 108. Additionally, for ease of description, the network flow control process 150 is described in terms of a credit bucket implementation. However, other embodiments may use a similar or equivalent timestamp implementation, or another form of rate limiting, to achieve similar functionality.

The depicted network flow control process 150 uses a plurality of N individual credit buckets 132 designated as "B0" through "BN," a proportional credit bucket 124 designated as "C," and a shared credit bucket 136 designated as "A." The network flow control process 150 also uses the proportionality factor calculator 126 to calculate the proportionality factor.

A plurality of N network traffic flows is present at the corresponding individual credit buckets 132. Each network traffic flow includes a quantity of data packets which arrive at the corresponding individual credit buckets 132. The number of data packets in each network traffic flow may be the same or different. In one embodiment, the individual credit buckets 132 are each allowed to pass a number of data packets equivalent to the credit balance of each individual credit bucket 132. For example, if credit bucket B0 is allocated 4,000 credits, then up to 4,000 credits worth of data packets may passed. The remaining data packets are dropped, or otherwise limited according to the rate limiting violation actions implemented by the rate limiter 118.

It should be noted that the 4,000 credits worth of data packets may be determined, at least in part, by the effective packet size and/or the effective packet quantity of the data packets. As described above, the effective size and quantity of data packets may be different from the actual size and quantity of data packets based on the proportionality factor calculated by the proportionality calculator 126. The proportionality factor may depend on the credit balance of the proportional credit bucket 124 and the refresh quantity of the shared credit bucket 136, as described above.

Although the credit bucket B0 is initially allocated 4,000 credits, for example, the data packets corresponding to the 4,000 credits may or may not be passed, depending on the credits available in the shared credit bucket 136. Before determining the impact of the shared credit bucket 136, the proportional credit bucket 124 may calculate a total of the credits corresponding to the data packets that might be transferred by the individual credit buckets 132 in a specified group. This total is debited from the proportional credit bucket 124 as an indication of the total subscription of the individual network traffic flows in the specified group.

The shared credit bucket 136 then determines if any additional packets need to be dropped to maintain the total bandwidth usage within the allocated bandwidth. For example, if the total demand of the combined network traffic flows exceeds the shared credit balance of the shared credit bucket 136, then additional packets may be dropped or otherwise limited to avoid passing too many data packets. These additional dropped packets may be proportionally dropped from the various network traffic flows, or may be dropped from a subset of the individual network traffic flows.

It should be noted that the individual credit buckets 132 and the shared credit bucket 136 form a two-level hierarchy of credit buckets. In one embodiment, there may be 1,024 individual credit buckets 132 and 256 shared credit buckets 136, so that there are on average four individual credit buckets 132 for every shared credit bucket 136. Other embodiments may implement fewer or more hierarchical credit buckets and/or more than two hierarchical levels.

For each of the hierarchical credit buckets, a number of parameters, or variables, may be configured. An exemplary parameter includes the number of credits to accumulate each time the corresponding credit bucket is updated, or refreshed. For example, each individual credit bucket 132 may be refreshed every 8K clocks, which at a clock rate of 166 MHz is every $49.35 \times 10^{-6}$ seconds. Other exemplary parameters include the action to be taken in the event that a violation occurs, a bucket enable bit, a credit bucket saturation limit (e.g., a maximum credit amount), a drop override bit, a proportional limiting enable bit, a violation control bit, and a "A vio eq no B Debit" bit or a "B vio eq no A Debit" bit.

In one embodiment, the violation checks for the different hierarchical credit buckets are performed in parallel and the results are then combined. The violation checks may obtain credit bucket identifiers (IDs), which may be valid or not valid. The following table shows exemplary credit debiting results that may be implemented for an embodiment of a rate limiting implementation.

| A-credit bucket enabled (and valid) | B-credit bucket enabled (and valid) | A vio eq no B Debit | B vio eq no A Debit | CREDIT DEBITING RESULT |
|---|---|---|---|---|
| 0 | 1 | X | X | A-credit bucket rate limiting disabled. B-credit bucket rate limiting enabled. If rate limit check vs. B-credit bucket passes, decrement credits from B-credit bucket. |

-continued

| A-credit bucket enabled (and valid) | B-credit bucket enabled (and valid) | A vio eq no B Debit | B vio eq no A Debit | CREDIT DEBITING RESULT |
|---|---|---|---|---|
| 1 | 0 | X | X | A-credit bucket rate limiting enabled. If rate limit check vs. A-credit bucket passes, decrement credits from A-credit bucket. B-credit bucket rate limiting disabled. |
| 1 | 1 | 0 | 0 | A-credit bucket rate limiting enabled. If rate limit check vs. A-credit bucket passes, decrement credits from A-credit bucket. B-credit bucket rate limiting enabled. If rate limit check vs. B-credit bucket passes, decrement credits from B-credit bucket. |
| 1 | 1 | 0 | 1 | A-credit bucket rate limiting enabled. If rate limit check vs. A-credit bucket passes, and rate limit check vs. B-credit bucket passes, decrement credits from A-credit bucket. B-credit bucket rate limiting enabled. If rate limit check vs. B-credit bucket passes, decrement credits from B-credit bucket. |
| 1 | 1 | 1 | 0 | A-credit bucket rate limiting enabled. If rate limit check vs. A-credit bucket passes, decrement credits from A-credit bucket. B-credit bucket rate limiting enabled. If rate limit check vs. B-credit bucket passes, and rate limit check vs. A-credit bucket passes, decrement credits from B-credit bucket. |
| 1 | 1 | 1 | 1 | A-credit bucket rate limiting enabled. If rate limit check vs. A-credit bucket passes, and rate limit check vs. B-credit bucket passes, decrement credits from A-credit bucket. B-credit bucket rate limiting enabled. If rate limit check vs. B-credit bucket passes, and rate limit check vs. A-credit bucket passes, decrement credits from B-credit bucket. |

The following table illustrates exemplary violation action results that may be implemented by the rate limiter 118.

| A-credit bucket enabled (and valid) | B-credit bucket enabled (and valid) | Violation Control Bit (OR/AND#) | Drop Override Bit | VIOLATION ACTION RESULT |
|---|---|---|---|---|
| 0 | 0 | X | X | Rate limiting disabled, no checks, no violations. |
| 0 | 1 | X | X | A-credit bucket rate limiting disabled. B-credit bucket rate limiting enabled. If rate limit check vs. B-credit bucket is a violation, execute violation action for B-credit bucket. |
| 1 | 0 | X | X | A-credit bucket rate limiting enabled. If rate limit check vs. B-credit bucket is a violation, execute violation action for B-credit bucket. B-credit bucket rate limiting disabled. |
| 1 | 1 | 0 | X | If A or B do not violate, do nothing. If both A and B violate, then execute the violation action for A-credit bucket. |
| 1 | 1 | 1 | 0 | If A and B do not violate, do nothing. If A violates, and B does not, then execute the violation action for A-credit bucket. If B violates, and A does not, then execute the violation action for the B-credit bucket. If both A and B violate, then execute the violation action for A-credit bucket. |
| 1 | 1 | 1 | 1 | If A and B do not violate, do nothing. If A violates, and B does not, then execute the violation action for A-credit bucket. If B violates, and A does not, then execute the violation action for the B-credit bucket. If both A and B violate, and either violation action is a drop packets, then drop, else execute the violation action for A-credit bucket. |

Figure 6:
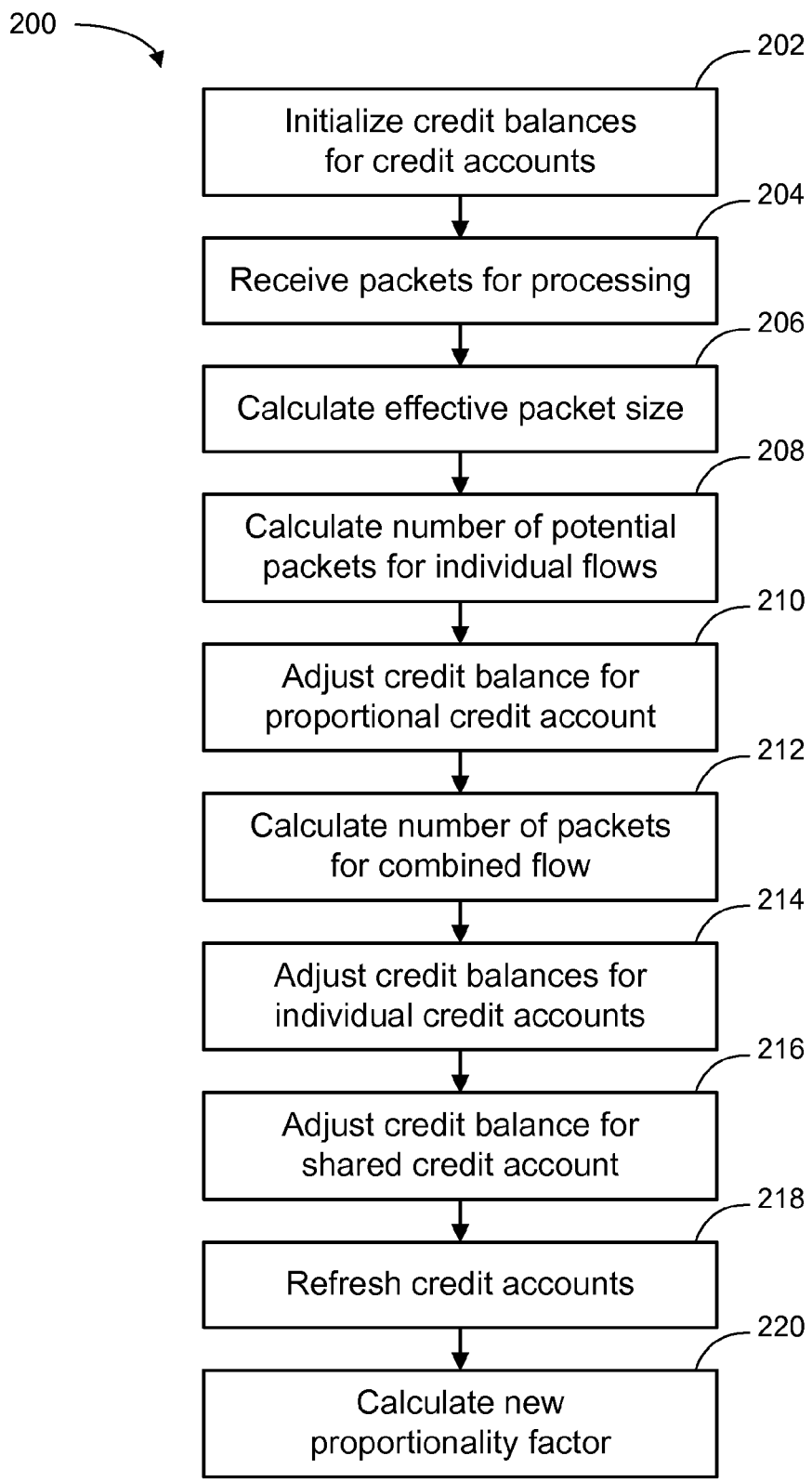
FIG. 6 depicts a schematic flow chart diagram of one embodiment of a network flow control method.

FIG. 6 depicts a schematic flow chart diagram of one embodiment of a network flow control method 200. In general, the depicted network flow control method 200 shows high level operations of the network flow controller of FIG. 2. Other embodiments of the network flow control method 200 may be implemented in conjunction with other network flow controllers or network nodes.

In the illustrated network flow control method 200, at block 202, network flow controller 108 initializes the credit balances for all of the credit accounts. In one embodiment, the network flow controller 108 invokes the refresh generator 116 to initialize the credit balances. At block 204, the network flow controller 108 receives packets for processing. At block 206, the network flow controller 108 calculates an effective packet size and, at block 208, calculates a number of potential packets that might be passed for the individual network traffic flows.

At block 210, the proportional flow creditor 112 adjusts the credit balance for the proportional credit account 124. As explained above, the proportional flow creditor 112 may debit the credit balance up to the sum total of all of the credit balances for all of the individual credit accounts 132. At block 212, the network flow controller 108 then calculates a number of packets for the combined, or shared, network traffic flow. As explained above, this number may be less than the sum of the potential number of packets that might be passed by the individual network traffic flows.

At block 214, the individual flow creditors 120 adjust the credit balances for the corresponding individual credit accounts 132. Similarly, at block 216, the shared flow creditor 122 adjusts the credit balance for the shared credit account 136. At block 218, the refresh generator 116 then refreshes all of the credit accounts with specified refresh quantities, which may be different for different credit accounts. At block 220, the proportionality factor calculator 126 then calculates a new proportionality factor based on the cumulative credit balance of the proportional credit account 124 and the credit refresh quantity of the shared credit account 136, as described above. The depicted network flow control method 200 then ends.

Figure 7:
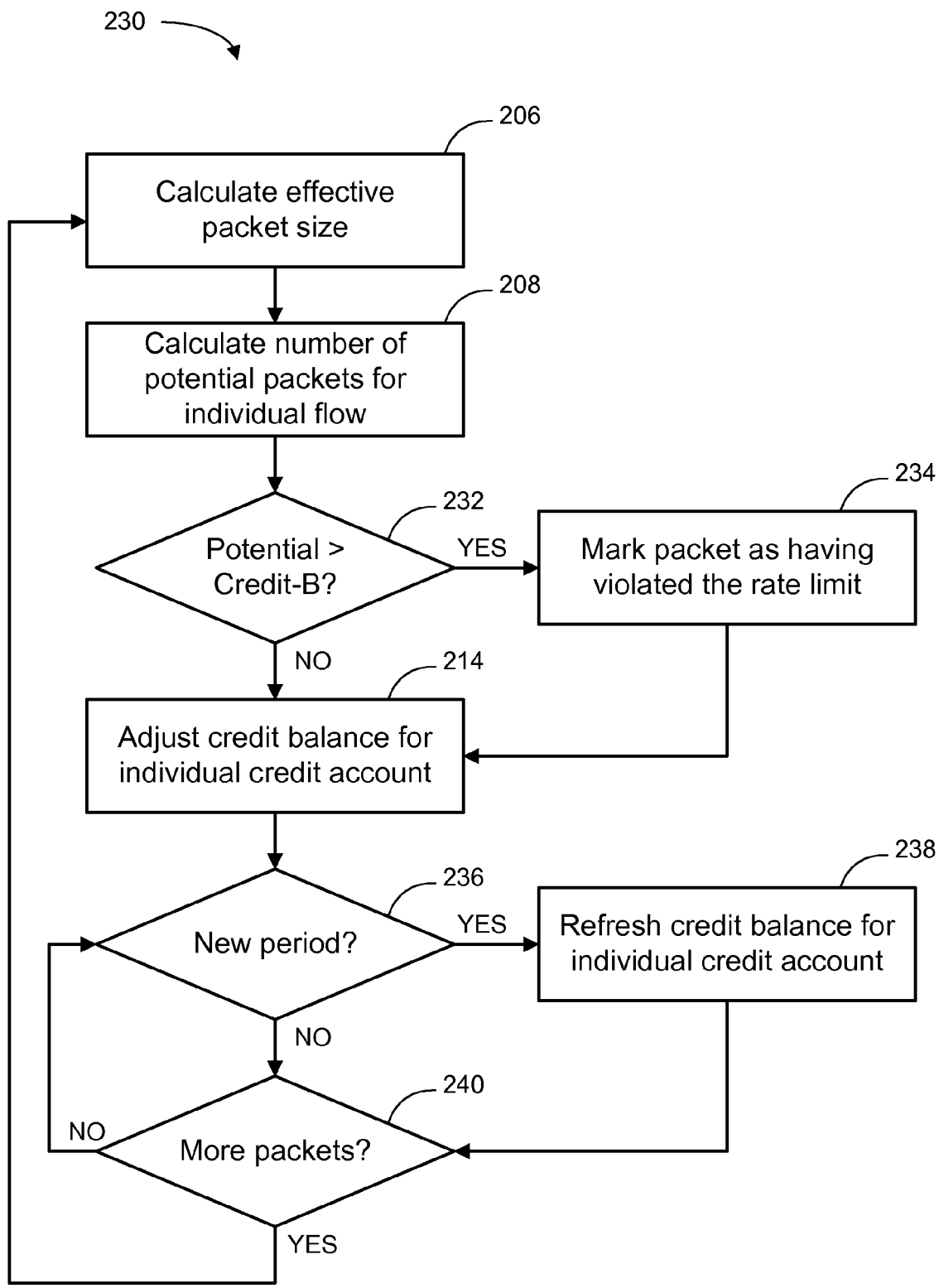
FIG. 7 depicts a schematic flow chart diagram of one embodiment of a method of operation for the individual flow creditor of FIG. 3.

FIG. 7 depicts a schematic flow chart diagram of one embodiment of a method 230 of operation for the individual flow creditor 120 of FIG. 3. Although the method 230 is described in conjunction with the individual flow creditor 120 of FIG. 3, other embodiments may be implemented in conjunction with other flow creditors or network flow controllers. Some of the operations of the method 230 are similar to operations of the network flow control method 200 of FIG. 6 and, hence, are not described in more detail in the description of FIG. 7.

In the illustrated method 230, after the effective packet size and the number of potential packets for individual network traffic flows are calculated, at block 232 the violation logic 134 of the individual flow creditor 120 determines if the number of potential packets exceeds the credit balance of the corresponding individual credit account 132. If the number of potential packets does exceed the credit balance, then at block 234 the rate limiter 118 marks at least some of the packets as having violated the rate limit, or otherwise limits the network traffic flow.

After adjusting the credit balance for the individual credit account 132, at block 236 the refresh generator 116 determines if there is a new refresh period and, if so, at block 238 refreshes the credit balance for the individual credit account 132. After refreshing the credit balance, or after determining that there is not a new refresh period, at block 240 the individual flow creditor 120 determines if there are more packets and, if so, returns to process the new packets in a similar manner as described above.

Figure 8:
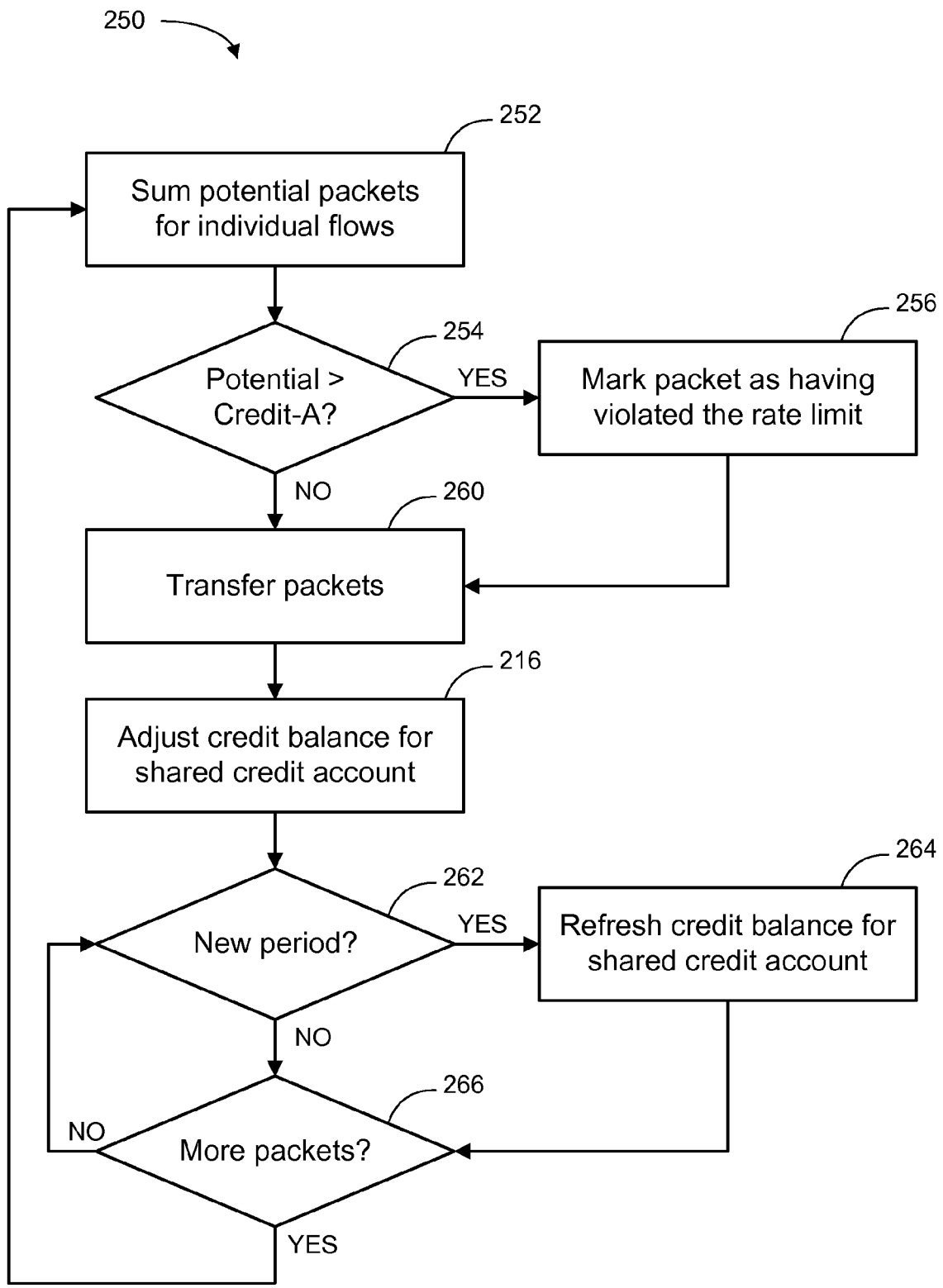
FIG. 8 depicts a schematic flow chart diagram of one embodiment of a method of operation for the shared flow creditor of FIG. 4.

FIG. 8 depicts a schematic flow chart diagram of one embodiment of a method 250 of operation for the shared flow creditor 122 of FIG. 4. Although the method 250 is described in conjunction with the shared flow creditor 122 of FIG. 4, other embodiments may be implemented in conjunctions with other flow creditors or network flow controllers. Some of the operations of the method 250 are similar to operations of the network flow control method 200 of FIG. 6 and, hence, are not described in more detail in the description of FIG. 8.

In the illustrated method 250, at block 252 the network flow controller 108 sums the potential packets for the individual network traffic flows. In some embodiments, the lengths, or sizes of the potential packets are added together. The effective sizes of the packets may be used instead of the actual sizes of the packets. At block 254, the violation logic 136 of the shared flow creditor 122 determines if the total number of potential packets exceeds the shared credit balance of the shared credit account 136. If the number of potential packets does exceed the shared credit balance, then at block 256 the rate limiter 118 marks at least some of the packets as having violated the rate limit, or otherwise limits the shared network flow traffic, as described above.

After adjusting the shared credit balance of the shared credit account 136, at block 262 the refresh generator 116 determines if there is a new refresh period and, if so, at block 264 refreshes the shared credit balance for the shared credit account 136. After refreshing the shared credit balance, or after determining that there is not a new refresh period, at block 266 the shared flow creditor 122 determines if there are more packets and, if so, returns to process new packets in a similar manner as described above.

Figure 9:
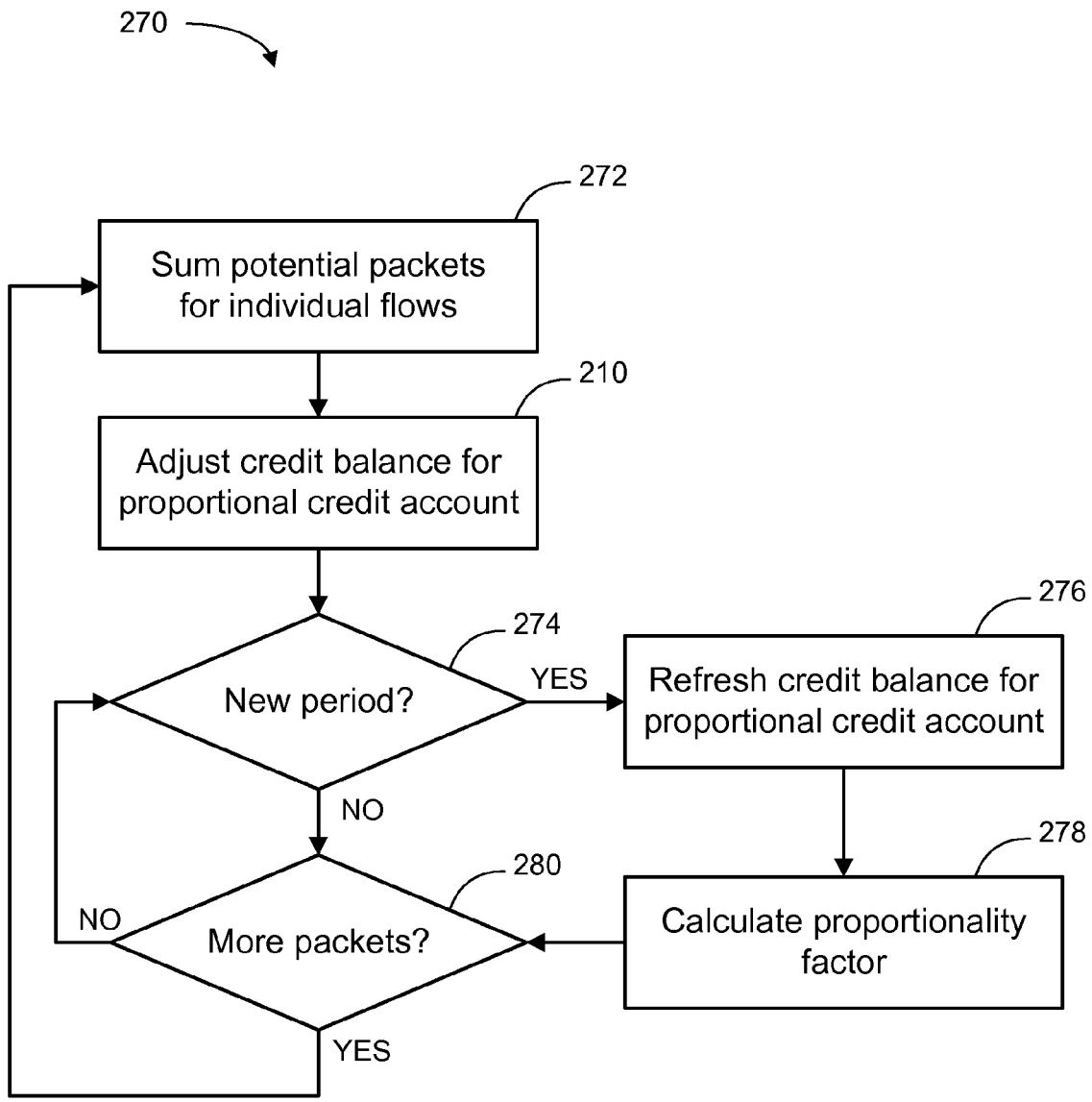
FIG. 9 depicts a schematic flow chart diagram of one embodiment of a method of operation for the proportional flow creditor of FIG. 2.

FIG. 9 depicts a schematic flow chart diagram of one embodiment of a method 270 of operation for the proportional flow creditor 112 of FIG. 2. Although the method 270 is described in conjunction with the proportional flow creditor 112 of FIG. 2, other embodiments may be implemented in conjunctions with other flow creditors or network flow controllers. Some of the operations of the method 270 are similar to operations of the network flow control method 200 of FIG. 6 and, hence, are not described in more detail in the description of FIG. 9.

In the illustrated method 270, at block 272 the network flow controller 108 sums the potential packets for the individual network traffic flows. In some embodiments, the lengths, or sizes of the potential packets are added together. The effective sizes of the packets may be used instead of the actual sizes of the packets. After adjusting the shared credit balance of the proportional credit account 124, at block 274 the refresh generator 116 determines if there is a new refresh period and, if so, at block 276 refreshes the proportional credit balance for the proportional credit account 124. At block 278, the proportionality factor calculator 126 then calculates a new proportionality factor, as described above. After calculating the new proportionality factor, or after determining that there is not a new refresh period, at block 280 the proportionality flow creditor 112 determines if there are more packets and, if so, returns to process the new packets in a similar manner as described above.

In order to better understand at least some embodiments of the network flow controller 108, the following examples illustrate how hierarchical rate limiting with proportional limiting may be implemented. For convenience, these examples refer to a credit bucket implementation. However, other implementations such as timestamp implementations may be used to achieve similar results. As a matter of convention in explaining the following examples, the shared credit bucket 134 is designated as the "A" credit bucket, the individual credit buckets 132 are designated as "B" credit buckets, and the proportional credit bucket 124 is designated as the "C" credit bucket.

EXAMPLE #1

The first example assumes partial credits are not used, all violations result in packet drops, A and B credit buckets are enabled and valid, proportional limiting is enabled, the violation control is true ("1"), the drop override bit is true, the "A vio eq no B Debit" bit is false ("0"), and the "B vio eq no A Debit" bit is true for each of four B-credit buckets B0-B3. The refresh interval is "t." For reference, each line of the following table provides a snapshot at a point in time between initialization (t=0) and the beginning of the time immediately after the third refresh period (3t).

| TIME | A | C | B0 | B1 | B2 | B2 | PF |
|---|---|---|---|---|---|---|---|
| t = 0 | 1000 | 1000 | 500 | 500 | 500 | 500 | 0 |
| rcvd | | | 500 | 500 | 500 | 500 | |
| passed | 1000 | 2000 | 500 | 500 | 500 | 500 | |
| credit | | | 500 | 500 | 500 | 500 | |
| B-drop | | | 0 | 0 | 0 | 0 | |
| A-drop | −1000 | | | | | | |
| t- | 0 | −1000 | | | | | |
| refresh | 1000 | 1000 | 500 | 500 | 500 | 500 | |
| t | 1000 | 0 | 500 | 500 | 500 | 500 | 0 |
| rcvd | | | 500 | 500 | 500 | 500 | |
| passed | 1000 | 2000 | 500 | 500 | 500 | 500 | |
| credit | | | 500 | 500 | 500 | 500 | |
| B-drop | | | 0 | 0 | 0 | 0 | |
| A-drop | −1000 | | | | | | |
| 2t- | 0 | −2000 | 0 | 0 | 0 | 0 | |
| refresh | 1000 | 1000 | 500 | 500 | 500 | 500 | |
| 2t | 1000 | −1000 | 500 | 500 | 500 | 500 | 1 |
| rcvd | | | 500 | 500 | 500 | 500 | |
| passed | 1000 | 1000 | 250 | 250 | 250 | 250 | |
| credit | | | 500 | 500 | 500 | 500 | |
| B-drop | | | −250 | −250 | −250 | −250 | |
| A-drop | 0 | | | | | | |
| 3t- | 0 | −2000 | 0 | 0 | 0 | 0 | |
| refresh | 1000 | 1000 | 500 | 500 | 500 | 500 | |
| 3t | 1000 | −1000 | 500 | 500 | 500 | 500 | 1 |

At t=0, the credit buckets and the proportionality factor are initialized, as follows:
  A-credit bucket is refreshed with 1000 credits (in bytes),
  C-credit bucket is therefore also refreshed with 1000 credits,
  B0-credit bucket is refreshed with 500 credits,
  B1-credit bucket is refreshed with 500 credits,
  B2-credit bucket is refreshed with 500 credits,
  B3-credit bucket is refreshed with 500 credits, and
  PF=0.

Before the next refresh interval at time t, 500 bytes of packets arrive from flow-0 which uses A-credit bucket and B0-credit bucket, 500 bytes of packets arrive from flow-1 which uses A-credit bucket and B1-credit bucket, 500 bytes of packets arrive from flow-2 which uses A-credit bucket and B2-credit bucket, and 500 bytes of packets arrive from flow-3 which uses A-credit bucket and B3-credit bucket. Since PF=0, all B-credit bucket calculations use the actual packet sizes, because the effective packet sizes are the same as the actual packet sizes. The credit balances of the credit buckets, at time t-, therefore become:

A-credit bucket=0,
  C-credit bucket=−1000, (e.g., 1000-2000 passed by B-credit buckets),
  B0-credit bucket=0,
  B1-credit bucket=0,
  B2-credit bucket=0, and
  B3-credit bucket=0.

After the last refresh, 2000 bytes total were received and passed by all four B-credit buckets, 500 bytes apiece. 1000 bytes were dropped because of A-credit bucket violations—the A-credit bucket only had 1000 credits to begin with. The packets that were dropped could have been from any combination of the four flows B0-B3.

After the next refresh, at time t, the credit balances are as follows:
  A-credit bucket is refreshed with 1000 credits, balance=1000,
  C-credit bucket is refreshed with 1000 credits, balance=0,
  B0-credit bucket is refreshed with 500 credits, balance=500,
  B1-credit bucket is refreshed with 500 credits, balance=500,
  B2-credit bucket is refreshed with 500 credits, balance=500,
  B3-credit bucket is refreshed with 500 credits, balance=500, and
  PF=0 (because C=0).

Before the next refresh at time 2t, 500 bytes of packets arrive from flow-0 which uses A-credit bucket and B0-credit bucket, 500 bytes of packets arrive from flow-1 which uses A-credit bucket and B1-credit bucket, 500 bytes of packets arrive from flow-2 which uses A-credit bucket and B2-credit bucket, and 500 bytes of packets arrive from flow-3 which uses A-credit bucket and B3-credit bucket. Again, since PF=0, all B-credit bucket calculations use the actual packet sizes. The credit balances of the credit buckets, at time 2t-, therefore become:

A-credit bucket=0,
  C-credit bucket=−2000, e.g., (0-2000 passed by B-credit buckets),
  B0-credit bucket=0,
  B1-credit bucket=0,
  B2-credit bucket=0, and
  B3-credit bucket=0.

So after the last refresh at time t, 2000 bytes more were received and passed by all the B-credit buckets, 500 bytes apiece. 1000 bytes again were dropped because of continuing A-credit bucket violations. The packets that were dropped could have been evenly distributed across all four flows.

After the next refresh, at time 2t, the credit balances are as follows:
  A-credit bucket is refreshed with 1000 credits, balance=1000,
  C-credit bucket is refreshed with 1000 credits, balance=−1000,
  B0-credit bucket is refreshed with 500 credits, balance=500,
  B1-credit bucket is refreshed with 500 credits, balance=500,
  B2-credit bucket is refreshed with 500 credits, balance=500, and
  B3-credit bucket is refreshed with 500 credits, balance=500.
  PF=1.

A PF of "1" is therefore assigned to the A-credit bucket.

Before the next refresh at time 3t, 500 bytes of packets arrive from flow-0 which uses A-credit bucket and B0-credit bucket, 500 bytes of packets arrive from flow-1 which uses A-credit bucket and B1-credit bucket, 500 bytes of packets arrive from flow-2 which uses A-credit bucket and B2-credit bucket, and 500 bytes of packets arrive from flow-3 which uses A-credit bucket and B3-credit bucket. Since PF=1, all B-credit bucket calculations use effective packet sizes which are two times the actual packet size. The credit balances of the credit buckets, at time 3t-, therefore become:

A-credit bucket=0,
C-credit bucket=−2000, e.g., (−1000-1000 passed by B-credit buckets),
B0-credit bucket=0,
B1-credit bucket=0,
B2-credit bucket=0, and
B3-credit bucket=0.

Since the last refresh at time 2t, each B-credit bucket has seen 500 bytes in flow packets. But each byte appeared twice as large in the B-credit bucket calculations. Each B-credit bucket started with 500 credits, so only 250 bytes would have actually passed. Therefore, 1000 credits of actual packet data will have passed by the B-credit buckets to the A-credit bucket. The B-credit buckets themselves will have independently and individually dropped the excess 1000 bytes.

After the next refresh, at time 3t, the credit balances are as follows:

A-credit bucket is refreshed with 1000 credits, balance=1000,
C-credit bucket is refreshed with 1000 credits, balance=−1000,
B0-credit bucket is refreshed with 500 credits, balance=500,
B1-credit bucket is refreshed with 500 credits, balance=500,
B2-credit bucket is refreshed with 500 credits, balance=500, and
B3-credit bucket is refreshed with 500 credits, balance=500.
PF=1.

The system now reaches a steady state because the proportionality factor remains 1 under the same refresh credit and arriving data packet quantities. Proportional limiting therefore provides a fair balance of limited resources, and embodiments of the present invention allow a user to specify the particular proportions to use. For example, a user may specify that one of the individual network traffic flows is twice as important as another network traffic flow. Therefore, the amount of credits available to the priority network traffic flow may be twice as much as the credits for the non-priority network traffic flow. This is shown in the second example, described below.

EXAMPLE #2

The second example uses three flows to share a bandwidth resource. If the shared bandwidth becomes scarce, then the first flow is prioritized to be twice as important as the second, and the second flow twice as important as the third. The second example assumes partial credits are not used, all violations result in packet drops, A and B credit buckets are enabled and valid, proportional limiting is enabled, the violation control is true ("1"), the drop override bits are true, the "A vio eq no B Debit" bit is false ("0"), and the "B vio eq no A Debit" bits are true for each of three B-credit buckets B0-B2. The refresh interval is "t." The proportionality factor is accurate to three decimal places right of the decimal point, but the buckets only resolve to whole credits. In the event of oversubscription of the shared bandwidth resource, flow-0 is assigned twice the bandwidth of flow-1, which in turn is assigned twice the bandwidth of flow-2. This is implemented by refreshing the B0, B1, and B2 buckets with different numbers of credits in the correct proportions. In order to make sure all of the shared bandwidth is always be available, the lowest priority bucket, B2, is credited with the same number of credits as the A-credit bucket. For reference, each line of the following table provides a snapshot at a point in time between initialization (t=0) and the beginning of the time immediately after the fifth refresh period (5t).

| TIME    | A     | C     | B0    | B1    | B2    | PF    |
|---------|-------|-------|-------|-------|-------|-------|
| 0       | 1000  | 1000  | 4000  | 2000  | 1000  | 0     |
| rcvd    |       |       | 4000  | 4000  | 4000  |       |
| passed  | 1000  | 7000  | 4000  | 2000  | 1000  |       |
| credit  |       |       | 4000  | 2000  | 1000  |       |
| B-drop  |       |       | 0     | −2000 | −3000 |       |
| A-drop  | −6000 |       |       |       |       |       |
| t-      |       | 0     | −6000 |       |       |       |
| refresh | 1000  | 1000  | 4000  | 2000  | 1000  |       |
| t       | 1000  | −5000 | 4000  | 2000  | 1000  | 5     |
| rcvd    |       |       | 4000  | 4000  | 4000  |       |
| passed  | 1000  | 1165  | 666   | 333   | 166   |       |
| credit  |       |       | 3996  | 1998  | 996   |       |
| B-drop  |       |       | −3334 | −3667 | −3834 |       |
| A-drop  | −165  |       |       |       |       |       |
| 2t-     |       | 0     | −6165 | 4     | 2     | 4     |
| refresh | 1000  | 1000  | 4000  | 2000  | 1000  |       |
| 2t      | 1000  | −5165 | 4004  | 2002  | 1004  | 5.165 |
| rcvd    |       |       | 4000  | 4000  | 4000  |       |
| passed  | 1000  | 1135  | 649   | 324   | 162   |       |
| credit  |       |       | 4001  | 1997  | 998   |       |
| B-drop  |       |       | −3351 | −3676 | −3838 |       |
| A-drop  | −135  |       |       |       |       |       |
| 3t-     |       | 0     | −6300 | 3     | 5     | 6     |
| refresh | 1000  | 1000  | 4000  | 2000  | 1000  |       |
| 3t      | 1000  | −5300 | 4003  | 2005  | 1006  | 5.3   |
| rcvd    |       |       | 4000  | 4000  | 4000  |       |
| passed  | 1000  | 1112  | 635   | 318   | 159   |       |
| credit  |       |       | 4000  | 2003  | 1001  |       |
| B-drop  |       |       | −3365 | −3682 | −3841 |       |
| A-drop  | −112  |       |       |       |       |       |
| 4t-     |       | 0     | −6412 | 3     | 2     | 5     |
| refresh | 1000  | 1000  | 4000  | 2000  | 1000  |       |
| 4t      | 1000  | −5412 | 4003  | 2002  | 1005  | 5.412 |
| rcvd    |       |       | 4000  | 4000  | 4000  |       |
| passed  | 1000  | 1092  | 624   | 312   | 156   |       |
| credit  |       |       | 4001  | 2000  | 1000  |       |
| B-drop  |       |       | −3376 | −3688 | −3844 |       |
| A-drop  | −92   |       |       |       |       |       |
| 5t-     |       | 0     | −6504 | 2     | 2     | 5     |
| refresh | 1000  | 1000  | 4000  | 2000  | 1000  |       |
| 5t      | 1000  | −5504 | 4002  | 2002  | 1005  | 5.504 |

At t=0, the credit buckets and the proportionality factor are initialized, as follows:

A-credit bucket is refreshed with 1000 credits (in bytes),
C-credit bucket is therefore also refreshed with 1000 credits,
B0-credit bucket is refreshed with 4000 credits,
B1-credit bucket is refreshed with 2000 credits,
B2-credit bucket is refreshed with 1000 credits, and
PF=0.

Before the next refresh interval at time t, 4000 bytes of packets arrive from flow-0, 4000 bytes of packets arrive from flow-1, and 4000 bytes of packets arrive from flow-2. Since PF=0, all B-credit bucket calculations use the actual packet sizes. The credit balances of the credit buckets, at time t-, therefore become:

A-credit bucket=0,
C-credit bucket=−6000, e.g., (1000-7000 passed by B-credit buckets), B0-credit bucket=0,
B1-credit bucket=0, and
B2-credit bucket=0.

For the C-credit bucket, 7000 (out of 12,000 total bytes) were passed by the B-credit buckets, e.g., 4000 by B0-credit bucket, 2000 by B1-credit bucket, and 1000 by B2-credit bucket. 5000 bytes were dropped due to violations on the B-credit buckets. The dropped bytes are not debited against the A-credit bucket because the "B vio eq no A debit" bits are set to "1" for each B-credit bucket. Another 6000 bytes were dropped due to violations on the A-credit bucket. These 6000 dropped bytes could have been evenly distributed across the three flows.

After the next refresh, at time t, the credit balances are as follows:
A-credit bucket is refreshed with 1000 credits, balance=1000,
C-credit bucket is refreshed with 1000 credits, balance=−5000,
B0-credit bucket is refreshed with 4000 credits, balance=4000,
B1-credit bucket is refreshed with 2000 credits, balance=2000,
B2-credit bucket is refreshed with 1000 credits, balance=1000, and
PF=5.000

Before the next refresh at time 2t, 4000 bytes of packets arrive from flow-0 but these now appear to be six times larger for B0 calculations, e.g., 24,000 bytes. 4000 bytes of packets arrive from flow-1 and these too appear to be six times larger for B1 calculations, e.g., 24,000 bytes. And, 4000 bytes of packets arrive from flow-2 and appear to be six times larger for B1 calculations, e.g., 24,000 bytes. The credit balances of the credit buckets, at time 2t-, therefore become:
A-credit bucket=0 credits,
C-credit bucket=−6165 credits (−5000−1165 passed by B-credit buckets),
B0-credit bucket=4 credits (4000−(666*6)),
B1-credit bucket=2 credits (2000−(333*6)), and
B2-credit bucket=4 credits (1000−(166*6)).

After the last refresh at time t, 12,000 credits of packets were received, and 11,000 of them were dropped due to violations on the A and B credit buckets. B0-credit bucket violated all those after 666 bytes passed. B1-credit bucket violated after 333 bytes passed, and B2-credit bucket violated after 166 bytes passed. This totals 1165 bytes passed by the B-credit buckets to the A-credit bucket. The A-credit bucket would therefore violate the excess of 1000 bytes, e.g., 165 bytes from any or all of the three flows.

After the next refresh, at time 2t, the credit balances are as follows:
A-credit bucket is refreshed with 1000 credits, balance=1000,
C-credit bucket is refreshed with 1000 credits, balance=−5165,
B0-credit bucket is refreshed with 4000 credits, balance=4004,
B1-credit bucket is refreshed with 2000 credits, balance=2002,
B2-credit bucket is refreshed with 1000 credits, balance=1004, and
PF=5.165.

A PF of 5.165 is therefore assigned to the A-credit bucket.

Before the next refresh time at time 3t, 4000 bytes of packets arrive from each of flow-0, flow-1, and flow-2. Each packet appears to be 6.165 (1+5.165) times larger for their respective B-credit bucket calculations. The credit balances of the credit buckets, at time 3t-, therefore become:
A-credit bucket=0 credits,
C-credit bucket=−6300 credits (−5165−1135 passed by B-credit buckets),
B0-credit bucket=3 credits (4004−(649*6.165)),
B1-credit bucket=5 credits (2002−(324*6.165)), and
B2-credit bucket=6 credits (1004−(162*6.165)).

After the last refresh at time 2t, 12,000 credits of packets were received, and 11,000 of them were dropped due to violations on the A and B credit buckets. B0-credit bucket violated all those after 649 (4004/6.165) bytes passed. B1-credit bucket violated after 324 (2002/6.165) bytes passed, and B2-credit bucket violated after 162 (1004/6.165) bytes passed. This totals 1135 bytes passed by the B-credit buckets to the A-credit bucket. The A-credit bucket would therefore violate the excess of 1000 bytes, e.g., 135 bytes from any or all of the three flows.

After the next refresh, at time 3t, the credit balances are as follows:
A-credit bucket is refreshed with 1000 credits, balance=1000,
C-credit bucket is refreshed with 1000 credits, balance=−5300,
B0-credit bucket is refreshed with 4000 credits, balance=4003,
B1-credit bucket is refreshed with 2000 credits, balance=2005,
B2-credit bucket is refreshed with 1000 credits, balance=1006, and
PF=5.300

Before the next refresh time at time 4t, 4000 bytes of packets arrive from each of flow-0, flow-1, and flow-2. Each packet appears to be 6.300 (1+5.300) times larger for their respective B-credit bucket calculations. The credit balances of the credit buckets, at time 4t-, therefore become:
A-credit bucket=0 credits,
C-credit bucket=−6412 credits (−5300−1112 passed by B-credit buckets),
B0-credit bucket=3 credits (4003−(635*6.300)),
B1-credit bucket=2 credits (2005−(318*6.300)), and
B2-credit bucket=5 credits (1006−(159*6.300)).

After the last refresh at time 3t, 12,000 credits of packets were received, and 11,000 of them were dropped due to violations on the A and B credit buckets. B0-credit bucket violated all those after 635 (4003/6.300) bytes passed. B1-credit bucket violated after 318 (2005/6.300) bytes passed, and B2-credit bucket violated after 159 (1006/6.300) bytes passed. This totals 1112 bytes passed by the B-credit buckets to the A-credit bucket. The A-credit bucket would therefore violate the excess of 1000 bytes, e.g., 112 bytes from any or all of the three flows.

After the next refresh, at time 4t, the credit balances are as follows:
A-credit bucket is refreshed with 1000 credits, balance=1000,
C-credit bucket is refreshed with 1000 credits, balance=−5412,
B0-credit bucket is refreshed with 4000 credits, balance=4003,
B1-credit bucket is refreshed with 2000 credits, balance=2002,
B2-credit bucket is refreshed with 1000 credits, balance=1005, and
PF=5.412.

Before the next refresh time at time 5t, 4000 bytes of packets arrive from each of flow-0, flow-1, and flow-2. Each packet appears to be 6.412 (1+5.412) times larger for their respective B-credit bucket calculations. The credit balances of the credit buckets, at time 5t-, therefore become:

A-credit bucket=0 credits,

C-credit bucket=-6504 credits (-5412-1092 passed by B-credit buckets),

B0-credit bucket=2 credits (4003-(624*6.412)),

B1-credit bucket=2 credits (2002-(312*6.412)), and

B2-credit bucket=5 credits (1005-(156*6.412)).

After the last refresh at time 4t, 12,000 credits of packets were received, and 11,000 of them were dropped due to violations on the A and B credit buckets. B0-credit bucket violated all those after 624 (4003/6.412) bytes passed. B1-credit bucket violated after 312 (2002/6.412) bytes passed, and B2-credit bucket violated after 156 (1005/6.412) bytes passed. This totals 1092 bytes passed by the B-credit buckets to the A-credit bucket. The A-credit bucket would therefore violate the excess of 1000 bytes, e.g., 92 bytes from any or all of the three flows.

After the next refresh, at time 5t, the credit balances are as follows:

A-credit bucket is refreshed with 1000 credits, balance=1000,

C-credit bucket is refreshed with 1000 credits, balance=-5504,

B0-credit bucket is refreshed with 4000 credits, balance=4002,

B1-credit bucket is refreshed with 2000 credits, balance=2002,

B2-credit bucket is refreshed with 1000 credits, balance=1005, and

PF=5.504.

In this second example, the system is asymptotically approaching a PF=6. After several more refresh cycles, a steady state would be reached. It is therefore unnecessary to show these next cycles step-by-step.

It should be noted that, although the second example uses three decimal places of precision to the right of the decimal point, other embodiments may be more or less precise. In one embodiment, the proportionality factor is represented using five bits. Three bits are used to represent the significant (with an integral value between 0 and 7), and two bits are used to represent and exponent (with an integral value between 0 and 3). In this way, the proportionality factor is represented as PF=significand^(exponent-3). In some embodiments, values are rounded down to the nearest value that can be represented using the five bits as described. Other embodiments may use fewer or more bits or may use the bits in a different way. The third example, which follows, is similar to the second example, except the third example uses less precision for the proportionality bit by representing it as an integer value.

EXAMPLE #3

The third example uses the same assumptions as the second example. In contrast to the second example, though, the third example is precise to an integer value, instead of to a decimal value. For reference, each line of the following table provides a snapshot at a point in time between initialization (t=0) and the beginning of the time immediately after the tenth refresh period (10t).

| TIME | A | C | B0 | B1 | B2 | PF |
|---|---|---|---|---|---|---|
| 0 | 1000 | 1000 | 4000 | 2000 | 1000 | 0 |
| rcvd | | | 4000 | 4000 | 4000 | |
| passed | 1000 | 7000 | 4000 | 2000 | 1000 | |
| credit | | | 4000 | 2000 | 1000 | |
| B-drop | | | 0 | -2000 | -3000 | |
| A-drop | -6000 | | | | | |
| t- | 0 | -6000 | | | | |
| refresh | 1000 | 1000 | 4000 | 2000 | 1000 | |
| t | 1000 | -5000 | 4000 | 2000 | 1000 | 5 |
| rcvd | | | 4000 | 4000 | 4000 | |
| passed | 1000 | 1165 | 666 | 333 | 166 | |
| credit | | | 3996 | 1998 | 996 | |
| B-drop | | | -3334 | -3667 | -3834 | |
| A-drop | -165 | | | | | |
| 2t- | 0 | -6165 | 4 | 2 | 4 | |
| refresh | 1000 | 1000 | 4000 | 2000 | 1000 | |
| 2t | 1000 | -5165 | 4004 | 2002 | 1004 | 5 |
| rcvd | | | 4000 | 4000 | 4000 | |
| passed | 1000 | 1167 | 667 | 333 | 167 | |
| credit | | | 4002 | 1998 | 1002 | |
| B-drop | | | -3333 | -3667 | -3833 | |
| A-drop | -167 | | | | | |
| 3t- | 0 | -6332 | 2 | 4 | 2 | |
| refresh | 1000 | 1000 | 4000 | 2000 | 1000 | |
| 3t | 1000 | -5332 | 4002 | 2004 | 1002 | 5 |
| rcvd | | | 4000 | 4000 | 4000 | |
| passed | 1000 | 1168 | 667 | 334 | 167 | |
| credit | | | 4002 | 2004 | 1002 | |
| B-drop | | | -3333 | -3666 | -3833 | |
| A-drop | -168 | | | | | |
| 4t- | 0 | -6500 | 0 | 0 | 0 | |
| refresh | 1000 | 1000 | 4000 | 2000 | 1000 | |
| 4t | 1000 | -5500 | 4000 | 2000 | 1000 | 5 |
| rcvd | | | 4000 | 4000 | 4000 | |
| passed | 1000 | 1165 | 666 | 333 | 166 | |
| credit | | | 3996 | 1998 | 996 | |
| B-drop | | | -3334 | -3667 | -3834 | |
| A-drop | -165 | | | | | |
| 5t- | 0 | -6665 | 4 | 2 | 4 | |
| refresh | 1000 | 1000 | 4000 | 2000 | 1000 | |
| 5t | 1000 | -5665 | 4004 | 2002 | 1004 | 5 |
| rcvd | | | 4000 | 4000 | 4000 | |
| passed | 1000 | 1167 | 667 | 333 | 167 | |
| credit | | | 4002 | 1998 | 1002 | |
| B-drop | | | -3333 | -3667 | -3833 | |
| A-drop | -167 | | | | | |
| 6t- | 0 | -6832 | 2 | 4 | 2 | |
| refresh | 1000 | 1000 | 4000 | 2000 | 1000 | |
| 6t | 1000 | -5832 | 4002 | 2004 | 1002 | 5 |
| rcvd | | | 4000 | 4000 | 4000 | |
| passed | 1000 | 1168 | 667 | 334 | 167 | |
| credit | | | 4002 | 2004 | 1002 | |
| B-drop | | | -3333 | -3666 | -3833 | |
| A-drop | -168 | | | | | |
| 7t- | 0 | -7000 | 0 | 0 | 0 | |
| refresh | 1000 | 1000 | 4000 | 2000 | 1000 | |
| 7t | 1000 | -6000 | 4000 | 2000 | 1000 | 6 |
| rcvd | | | 4000 | 4000 | 4000 | |
| passed | 998 | 998 | 571 | 285 | 142 | |
| credit | | | 3997 | 1995 | 994 | |
| B-drop | | | -3429 | -3715 | -3858 | |
| A-drop | 0 | | | | | |
| 8t- | 2 | -6998 | 3 | 5 | 6 | |
| refresh | 1000 | 1000 | 4000 | 2000 | 1000 | |
| 8t | 1002 | -5998 | 4003 | 2005 | 1006 | 5 |
| rcvd | | | 4000 | 4000 | 4000 | |
| passed | 1000 | 1168 | 667 | 334 | 167 | |
| credit | | | 4002 | 2004 | 1002 | |
| B-drop | | | -3333 | -3666 | -3833 | |
| A-drop | -168 | | | | | |
| 9t- | 2 | -7166 | 1 | 1 | 4 | |
| refresh | 1000 | 1000 | 4000 | 2000 | 1000 | |
| 9t | 1002 | -6166 | 4001 | 2001 | 1004 | 6 |
| rcvd | | | 4000 | 4000 | 4000 | |
| passed | 999 | 999 | 571 | 285 | 143 | |
| credit | | | 3997 | 1995 | 1001 | |
| B-drop | | | -3429 | -3715 | -3857 | |

-continued

| TIME | A | C | B0 | B1 | B2 | PF |
|---|---|---|---|---|---|---|
| A-drop | 0 | | | | | |
| 10t- | 3 | −7165 | 4 | 6 | 3 | |
| refresh | 1000 | 1000 | 4000 | 2000 | 1000 | |
| 10t | 1003 | −6165 | 4004 | 2006 | 1003 | 6 |

At t=0, the credit buckets and the proportionality factor are initialized, as follows:
A-credit bucket is refreshed with 1000 credits (in bytes),
C-credit bucket is therefore also refreshed with 1000 credits,
B0-credit bucket is refreshed with 4000 credits,
B1-credit bucket is refreshed with 2000 credits,
B2-credit bucket is refreshed with 1000 credits, and
PF=0.

Before the next refresh interval at time t, 4000 bytes of packets arrive from flow-0, 4000 bytes of packets arrive from flow-1, and 4000 bytes of packets arrive from flow-2. Since PF=0, all B-credit bucket calculations use the actual packet sizes. The credit balances of the credit buckets, at time t-, therefore become:
A-credit bucket=0,
C-credit bucket=−6000, e.g., (1000−7000 passed by B-credit buckets),
B0-credit bucket=0,
B1-credit bucket=0, and
B2-credit bucket=0.

For the C-credit bucket, 7000 (out of 12,000 total bytes) were passed by the B-credit buckets, e.g., 4000 by B0-credit bucket, 2000 by B1-credit bucket, and 1000 by B2-credit bucket. 5000 bytes were dropped due to violations on the B-credit buckets. The dropped bytes are not debited against the A-credit bucket because the "B vio eq no A debit" bits are set to "1" for each B-credit bucket. Another 6000 bytes were dropped due to violations on the A-credit bucket. These 6000 dropped bytes could have been evenly distributed across the three flows.

After the next refresh, at time t, the credit balances are as follows:
A-credit bucket is refreshed with 1000 credits, balance=1000,
C-credit bucket is refreshed with 1000 credits, balance=−5000,
B0-credit bucket is refreshed with 4000 credits, balance=4000,
B1-credit bucket is refreshed with 2000 credits, balance=2000,
B2-credit bucket is refreshed with 1000 credits, balance=1000, and
PF=5.

A PF of 5 is therefore assigned to the A-credit bucket. In one embodiment, the PF of 5 is represented by a binary significand portion, 101, and a binary exponent portion, 01, so that the proportionality factor is expressed in binary format as 10101.

Before the next refresh at time 2t, 4000 bytes of packets arrive from flow-0 but these now appear to be six times larger for B0 calculations, e.g., 24,000 bytes. 4000 bytes of packets arrive from flow-1 and these too appear to be six times larger for B1 calculations, e.g., 24,000 bytes. And, 4000 bytes of packets arrive from flow-2 and appear to be six times larger for B1 calculations, e.g., 24,000 bytes. The credit balances of the credit buckets, at time 2t-, therefore become:

A-credit bucket=0 credits,
C-credit bucket=−6165 credits (−5000−1165 passed by B-credit buckets),
B0-credit bucket=4 credits (4000−(666*6)),
B1-credit bucket=2 credits (2000−(333*6)), and
B2-credit bucket=4 credits (1000−(166*6)).

After the last refresh at time t, 12,000 credits of packets were received, and 11,000 of them were dropped due to violations on the A and B credit buckets. B0-credit bucket violated all those after 666 bytes passed. B1-credit bucket violated after 333 bytes passed, and B2-credit bucket violated after 166 bytes passed. This totals 1165 bytes passed by the B-credit buckets to the A-credit bucket. The A-credit bucket would therefore violate the excess of 1000 bytes, e.g., 165 bytes from any or all of the three flows.

After the next refresh, at time 2t, the credit balances are as follows:
A-credit bucket is refreshed with 1000 credits, balance=1000,
C-credit bucket is refreshed with 1000 credits, balance=−5165,
B0-credit bucket is refreshed with 4000 credits, balance=4004,
B1-credit bucket is refreshed with 2000 credits, balance=2002,
B2-credit bucket is refreshed with 1000 credits, balance=1004, and
PF=5.165.

Since the PF value of 5.165 cannot be represented by a three-bit significand and a two-bit exponent, the proportionality factor is assigned a PF value of 5 (5.165 rounded down to the nearest integer value).

Before the next refresh time at time 3t, 4000 bytes of packets arrive from each of flow-0, flow-1, and flow-2. Each packet appears to be 6 (1+5) times larger for their respective B-credit bucket calculations. The credit balances of the credit buckets, at time 3t-, therefore become:
A-credit bucket=0 credits,
C-credit bucket=−6332 credits (−5165−1167 passed by B-credit buckets),
B0-credit bucket=2 credits (4004−(667*6)),
B1-credit bucket=4 credits (2002−(333*6)), and
B2-credit bucket=2 credits (1004−(167*6)).

After the last refresh at time 2t, 12,000 credits of packets were received, and 11,000 of them were dropped due to violations on the A and B credit buckets. B0-credit bucket violated all those after 667 (4004/6) bytes passed. B1-credit bucket violated after 333 (2002/6) bytes passed, and B2-credit bucket violated after 167 (1004/6) bytes passed. This totals 1167 bytes passed by the B-credit buckets to the A-credit bucket. The A-credit bucket would therefore violate the excess of 1000 bytes, e.g., 167 bytes from any or all of the three flows.

After the next refresh, at time 3t, the credit balances are as follows:
A-credit bucket is refreshed with 1000 credits, balance=1000,
C-credit bucket is refreshed with 1000 credits, balance=−5332,
B0-credit bucket is refreshed with 4000 credits, balance=4002,
B1-credit bucket is refreshed with 2000 credits, balance=2004,
B2-credit bucket is refreshed with 1000 credits, balance=1002, and
PF=5 (after rounding down from 5.332 to the nearest integer value).

Before the next refresh time at time 4t, 4000 bytes of packets arrive from each of flow-0, flow-1, and flow-2. Each packet appears to be 6 (1+5) times larger for their respective B-credit bucket calculations. The credit balances of the credit buckets, at time 4t-, therefore become:

A-credit bucket=0 credits,
C-credit bucket=−6500 credits (−5332−1168 passed by B-credit buckets),
B0-credit bucket=0 credits (4002−(667*6)),
B1-credit bucket=0 credits (2004−(334*6)), and
B2-credit bucket=0 credits (1002−(167*6)).

After the last refresh at time 3t, 12,000 credits of packets were received, and 11,000 of them were dropped due to violations on the A and B credit buckets. B0-credit bucket violated all those after 667 (4002/6) bytes passed. B1-credit bucket violated after 334 (2004/6) bytes passed, and B2-credit bucket violated after 167 (1002/6) bytes passed. This totals 1168 bytes passed by the B-credit buckets to the A-credit bucket. The A-credit bucket would therefore violate the excess of 1000 bytes, e.g., 168 bytes from any or all of the three flows.

After the next refresh, at time 4t, the credit balances are as follows:

A-credit bucket is refreshed with 1000 credits, balance=1000,
C-credit bucket is refreshed with 1000 credits, balance=−5500,
B0-credit bucket is refreshed with 4000 credits, balance=4000,
B1-credit bucket is refreshed with 2000 credits, balance=2000,
B2-credit bucket is refreshed with 1000 credits, balance=1000, and
PF=5 (after rounding down from 5.500 to the nearest integer value).

Before the next refresh time at time 5t, 4000 bytes of packets arrive from each of flow-0, flow-1, and flow-2. Each packet appears to be 6 (1+5) times larger for their respective B-credit bucket calculations. The credit balances of the credit buckets, at time 5t-, therefore become:

A-credit bucket=0 credits,
C-credit bucket=−6665 credits (−5500−1165 passed by B-credit buckets),
B0-credit bucket=4 credits (4000−(666*6)),
B1-credit bucket=2 credits (2000−(333*6)), and
B2-credit bucket=4 credits (1000−(166*6)).

After the last refresh at time 4t, 12,000 credits of packets were received, and 11,000 of them were dropped due to violations on the A and B credit buckets. B0-credit bucket violated all those after 666 (4000/6) bytes passed. B1-credit bucket violated after 333 (2000/6) bytes passed, and B2-credit bucket violated after 166 (1000/6) bytes passed. This totals 1165 bytes passed by the B-credit buckets to the A-credit bucket. The A-credit bucket would therefore violate the excess of 1000 bytes, e.g., 165 bytes from any or all of the three flows.

After the next refresh, at time 5t, the credit balances are as follows:

A-credit bucket is refreshed with 1000 credits, balance=1000,
C-credit bucket is refreshed with 1000 credits, balance=−5665,
B0-credit bucket is refreshed with 4000 credits, balance=4004,
B1-credit bucket is refreshed with 2000 credits, balance=2002,
B2-credit bucket is refreshed with 1000 credits, balance=1004, and
PF=5 (after rounding down from 5.665 to the nearest integer value).

Before the next refresh time at time 6t, 4000 bytes of packets arrive from each of flow-0, flow-1, and flow-2. Each packet appears to be 6 (1+5) times larger for their respective B-credit bucket calculations. The credit balances of the credit buckets, at time 6t-, therefore become:

A-credit bucket=0 credits,
C-credit bucket=−6832 credits (−5665−1167 passed by B-credit buckets),
B0-credit bucket=2 credits (4004−(667*6)),
B1-credit bucket=4 credits (2002−(333*6)), and
B2-credit bucket=2 credits (1004−(167*6)).

After the last refresh at time 5t, 12,000 credits of packets were received, and 11,000 of them were dropped due to violations on the A and B credit buckets. B0-credit bucket violated all those after 667 (4004/6) bytes passed. B1-credit bucket violated after 333 (2002/6) bytes passed, and B2-credit bucket violated after 167 (1004/6) bytes passed. This totals 1167 bytes passed by the B-credit buckets to the A-credit bucket. The A-credit bucket would therefore violate the excess of 1000 bytes, e.g., 167 bytes from any or all of the three flows.

After the next refresh, at time 6t, the credit balances are as follows:

A-credit bucket is refreshed with 1000 credits, balance=1000,
C-credit bucket is refreshed with 1000 credits, balance=−5832,
B0-credit bucket is refreshed with 4000 credits, balance=4002,
B1-credit bucket is refreshed with 2000 credits, balance=2004,
B2-credit bucket is refreshed with 1000 credits, balance=1002, and
PF=5 (after rounding down from 5.832 to the nearest integer value).

Before the next refresh time at time 7t, 4000 bytes of packets arrive from each of flow-0, flow-1, and flow-2. Each packet appears to be 6 (1+5) times larger for their respective B-credit bucket calculations. The credit balances of the credit buckets, at time 7t-, therefore become:

A-credit bucket=0 credits,
C-credit bucket=−6832 credits (−5832−1168 passed by B-credit buckets),
B0-credit bucket=0 credits (4002−(667*6)),
B1-credit bucket=0 credits (2004−(334*6)), and
B2-credit bucket=0 credits (1002−(167*6)).

After the last refresh at time 6t, 12,000 credits of packets were received, and 11,000 of them were dropped due to violations on the A and B credit buckets. B0-credit bucket violated all those after 667 (4002/6) bytes passed. B1-credit bucket violated after 334 (2004/6) bytes passed, and B2-credit bucket violated after 167 (1002/6) bytes passed. This totals 1168 bytes passed by the B-credit buckets to the A-credit bucket. The A-credit bucket would therefore violate the excess of 1000 bytes, e.g., 168 bytes from any or all of the three flows.

After the next refresh, at time 7t, the credit balances are as follows:

A-credit bucket is refreshed with 1000 credits, balance=1000,
C-credit bucket is refreshed with 1000 credits, balance=−6000, B0-credit bucket is refreshed with 4000 credits, balance=4000, B1-credit bucket is refreshed with 2000 credits, balance=2000, B2-credit bucket is refreshed with 1000 credits, balance=1000, and PF=6 (rounding is not necessary).

Before the next refresh time at time 8t, 4000 bytes of packets arrive from each of flow-0, flow-1, and flow-2. Each packet appears to be 7 (1+6) times larger for their respective B-credit bucket calculations. The credit balances of the credit buckets, at time 8t-, therefore become:

A-credit bucket=0 credits,

C-credit bucket=−6998 credits (−6000−998 passed by B-credit buckets),

B0-credit bucket=3 credits (4000−(571*7)),

B1-credit bucket=5 credits (2000−(285*7)), and

B2-credit bucket=6 credits (1000−(142*7)).

After the last refresh at time 7t, 12,000 credits of packets were received, and 11,000 of them were dropped due to violations on the A and B credit buckets. B0-credit bucket violated all those after 571 (4000/7) bytes passed. B1-credit bucket violated after 285 (2000/7) bytes passed, and B2-credit bucket violated after 142 (1000/7) bytes passed. This totals 998 bytes passed by the B-credit buckets to the A-credit bucket. The A-credit bucket would therefore not violate any packets. The network traffic flows are now balanced.

After the next refresh, at time 8t, the credit balances are as follows:

A-credit bucket is refreshed with 1000 credits, balance=1000,

C-credit bucket is refreshed with 1000 credits, balance=−5998,

B0-credit bucket is refreshed with 4000 credits, balance=4003,

B1-credit bucket is refreshed with 2000 credits, balance=2005,

B2-credit bucket is refreshed with 1000 credits, balance=1006, and

PF=5 (after rounding down from 5.986 to the nearest integer value).

Before the next refresh time at time 9t, 4000 bytes of packets arrive from each of flow-0, flow-1, and flow-2. Each packet appears to be 6 (1+5) times larger for their respective B-credit bucket calculations. The credit balances of the credit buckets, at time 9t-, therefore become:

A-credit bucket=0 credits,

C-credit bucket=−7166 credits (−5998−1168 passed by B-credit buckets),

B0-credit bucket=1 credits (4003−(667*6)),

B1-credit bucket=1 credits (2005−(334*6)), and

B2-credit bucket=4 credits (1006−(167*6)).

After the last refresh at time 8t, 12,000 credits of packets were received, and 11,000 of them were dropped due to violations on the A and B credit buckets. B0-credit bucket violated all those after 667 (4003/6) bytes passed. B1-credit bucket violated after 334 (2005/6) bytes passed, and B2-credit bucket violated after 167 (1006/6) bytes passed. This totals 1168 bytes passed by the B-credit buckets to the A-credit bucket. The A-credit bucket would therefore violate the excess of 1000 bytes, e.g., 168 bytes from any or all of the three flows.

After the next refresh, at time 9t, the credit balances are as follows:

A-credit bucket is refreshed with 1000 credits, balance=1000,

C-credit bucket is refreshed with 1000 credits, balance=−6166,

B0-credit bucket is refreshed with 4000 credits, balance=4001,

B1-credit bucket is refreshed with 2000 credits, balance=2001,

B2-credit bucket is refreshed with 1000 credits, balance=1004, and

PF=6 (after rounding down from 6.154 to the nearest integer value).

Before the next refresh time at time 10t, 4000 bytes of packets arrive from each of flow-0, flow-1, and flow-2. Each packet appears to be 7 (1+6) times larger for their respective B-credit bucket calculations. The credit balances of the credit buckets, at time 10t-, therefore become:

A-credit bucket=0 credits,

C-credit bucket=−7165 credits (−6166−999 passed by B-credit buckets),

B0-credit bucket=4 credits (4001−(571*7)),

B1-credit bucket=6 credits (2001−(285*7)), and

B2-credit bucket=3 credits (1004−(143*7)).

After the last refresh at time 9t, 12,000 credits of packets were received, and 11,000 of them were dropped due to violations on the A and B credit buckets. B0-credit bucket violated all those after 571 (4001/7) bytes passed. B1-credit bucket violated after 285 (2001/7) bytes passed, and B2-credit bucket violated after 143 (1004/7) bytes passed. This totals 999 bytes passed by the B-credit buckets to the A-credit bucket. The A-credit bucket would therefore not violate any packets. The network traffic flows are now balanced.

After the next refresh, at time 9t, the credit balances are as follows:

A-credit bucket is refreshed with 1000 credits, balance=1000,

C-credit bucket is refreshed with 1000 credits, balance=−6165,

B0-credit bucket is refreshed with 4000 credits, balance=4004,

B1-credit bucket is refreshed with 2000 credits, balance=2006,

B2-credit bucket is refreshed with 1000 credits, balance=1003, and

PF=6 (after rounding down from 6.147 to the nearest integer value).

Embodiments of the invention also may involve a number of functions to be performed by a computer processor such as a central processing unit (CPU), a microprocessor, or another type of general-purpose or application-specific processor. The microprocessor may be a specialized or dedicated microprocessor that is configured to perform particular tasks by executing machine-readable software code that defines the particular tasks. The microprocessor also may be configured to operate and communicate with other devices such as direct memory access modules, memory storage devices, Internet related hardware, and other devices that relate to the transmission of data. The software code may be configured using software formats such as Java, C++, XML (Extensible Markup Language) and other languages that may be used to define functions that relate to operations of devices required to carry out the functional operations related described herein. The code may be written in different forms and styles, many of which are known to those skilled in the art. Different code formats, code configurations, styles and forms of software programs and other means of configuring code to define the operations of a microprocessor may be implemented.

Within the different types of processors that utilize embodiments of invention, there exist different types of memory devices for storing and retrieving information while performing some or all of the functions described herein. In some embodiments, the memory/storage device where data is stored may be a separate device that is external to the processor, or may be configured in a monolithic device, where the memory or storage device is located on the same integrated circuit, such as components connected on a single substrate. Cache memory devices are often included in computers for use by the processor as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform certain functions when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. Embodiments may be implemented with various memory and storage devices, as well as any commonly used protocol for storing and retrieving information to and from these memory devices respectively. In particular, a computer readable storage medium embodying a program of machine-readable instructions, executable by a digital processor, may perform one or more operations of an embodiment of the invention.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A network flow controller to manage network traffic bandwidth, the network flow controller comprising:
    a hierarchical flow creditor to manage a plurality of hierarchical credit accounts, the hierarchical credit accounts comprising a shared credit account associated with a plurality of distinct network traffic flows for a shared bandwidth resource;
    a proportional flow creditor to track an oversubscription of the shared bandwidth resource by the plurality of distinct network traffic flows, wherein the proportional flow creditor comprises a proportionality factor calculator to calculate a proportionality factor indicative of the oversubscription of the shared bandwidth resource, according to the following:

$$PF = \frac{-C}{A},$$

where PF designates the proportionality factor, C designates a quantification of the oversubscription of the shared bandwidth resource, and A designates a credit refresh quantity of the shared credit account; and
    a rate limiter coupled to the hierarchical flow creditor and the proportional flow creditor, the rate limiter to limit at least one of the plurality of distinct network traffic flows based on the oversubscription tracked by the proportional flow creditor.

2. The network flow controller of claim 1, the proportional flow creditor to manage a proportional credit account, the proportional credit account to track a credit balance indicative of the oversubscription of the shared bandwidth resource.

3. The network flow controller of claim 2, further comprising a refresh generator to refresh credit balances for the proportional credit account and the hierarchical credit accounts.

4. The network flow controller of claim 1, further comprising initialization logic to initialize the proportionality factor to a value of zero.

5. The network flow controller of claim 4, the hierarchical flow creditor further comprising a plurality of individual flow creditors corresponding to the plurality of distinct network traffic flows, each of the individual flow creditors configured to implement an individual credit account to track a credit balance for a corresponding network traffic flow.

6. The network flow controller of claim 5, each of the plurality of individual flow creditors comprising violation logic, the violation logic to determine whether a received packet quantity of the corresponding network traffic flow exceeds the credit balance for the corresponding individual credit account and to compute an effective packet quantity based on the received packet quantity and the proportionality factor.

7. The network flow controller of claim 1, further comprising a shared flow creditor corresponding to the shared network resource, the shared flow creditor to manage the shared credit account to track a shared credit balance for a combination of the plurality of distinct network traffic flows, the shared flow creditor comprising violation logic, the violation logic to determine whether a combined packet quantity of the combination of distinct network traffic flows exceeds the shared credit balance for the combination of distinct network traffic flows.

8. The network flow controller of claim 1, the rate limiter further configured to proportionally limit each of the plurality of network traffic flows.

9. The network flow controller of claim 1, the proportional flow creditor comprising enable logic, the enable logic to alternatively enable and disable the proportional flow creditor.

10. A method for controlling network traffic, the method comprising:
    receiving at a network node a plurality of distinct network traffic flows for a shared bandwidth resource;
    calculating within an input processor of the network node a proportionality factor indicative of an oversubscription of the shared bandwidth resource by the plurality of distinct network traffic flows, wherein the proportionality factor is calculated according to the following:

$$PF = \frac{-C}{A},$$

where PF designates the proportionality factor, C designates a quantification of the oversubscription of the shared bandwidth resource, and A designates a credit refresh quantity of a shared credit account; and limiting at least one of the plurality of distinct network traffic flows based on the proportionality factor.

11. The method of claim 10, further comprising:
computing an effective packet quantity based on a received packet quantity and the proportionality factor; and
computing an effective packet size according to the following:

$$P' = P \times (1+\text{PF}),$$

where P' designates the effective packet size, and P designates an actual packet size.

12. The method of claim 11, further comprising determining a number of potential packets for transfer by each of the plurality of distinct network traffic flows based on the effective packet quantity and the effective packet size.

13. The method of claim 12, further comprising adjusting credit balances of a plurality of individual credit accounts, corresponding to the plurality of distinct network traffic flows, by an amount equal to the number of potential packets for transfer by each of the plurality of distinct network traffic flows.

14. The method of claim 12, further comprising adjusting a credit balance of a proportional credit account by an amount equal to a sum of the potential packets for transfer by all of the plurality of distinct network traffic flows.

15. The method of claim 12, further comprising:
determining a number of packets for transfer over the shared bandwidth resource;
transferring the packets over the shared bandwidth resource; and
adjusting a credit balance of a shared credit account by an amount equal to the number of packets transferred over the shared bandwidth resource.

16. The method of claim 10, further comprising:
periodically refreshing credit balances of a plurality of individual credit accounts corresponding to the plurality of distinct network traffic flows;
periodically refreshing a shared credit balance of a shared credit account associated with a combination of the distinct network traffic flows; and
periodically refreshing a credit balance of a proportional credit account with an amount equal to an amount credited to the shared credit account.

17. A computer readable storage medium embodying a program of machine-readable instructions, executable by a digital processor, to perform operations to control network traffic, the operations comprising:

an operation to receive a plurality of distinct network traffic flows for a shared bandwidth resource;

an operation to calculate a proportionality factor indicative of an oversubscription of the shared bandwidth resource by the plurality of distinct network traffic flows, wherein the proportionality factor is calculated according to the following:

$$PF = \frac{-C}{A},$$

where PF designates the proportionality factor, C designates a quantification of the oversubscription of the shared bandwidth resource, and A designates a credit refresh quantity of a shared credit account; and an operation to proportionally limit the plurality of distinct network traffic flows based on the proportionality factor.

\* \* \* \* \*